US012671078B2

(12) United States Patent
Yadav et al.

(10) Patent No.: US 12,671,078 B2
(45) Date of Patent: Jun. 30, 2026

(54) RECHARGEABLE ALKALINE MANGANESE DIOXIDE-ZINC BIPOLAR BATTERIES

(71) Applicant: RESEARCH FOUNDATION OF THE CITY UNIVERSITY OF NEW YORK, New York, NY (US)

(72) Inventors: Gautam G. Yadav, New York, NY (US); Michael Nyce, New York, NY (US); Xia Wei, New York, NY (US); Roman Yakobov, New York, NY (US); Joshua Gallaway, New York, NY (US); Sanjoy Banerjee, New York, NY (US)

(73) Assignee: RESEARCH FOUNDATION OF THE CITY UNIVERSITY OF NEW YORK, New York, NY (US)

( * ) Notice: Subject to any disclaimer, the term of this patent is extended or adjusted under 35 U.S.C. 154(b) by 1788 days.

(21) Appl. No.: 16/074,678

(22) PCT Filed: Feb. 2, 2017

(86) PCT No.: PCT/US2017/016209
§ 371 (c)(1),
(2) Date: Aug. 1, 2018

(87) PCT Pub. No.: WO2017/136545
PCT Pub. Date: Aug. 10, 2017

(65) Prior Publication Data
US 2019/0044129 A1 Feb. 7, 2019

Related U.S. Application Data

(60) Provisional application No. 62/290,161, filed on Feb. 2, 2016.

(51) Int. Cl.
H01M 4/24 (2006.01)
H01M 4/04 (2006.01)
(Continued)

(52) U.S. Cl.
CPC ........... H01M 4/244 (2013.01); H01M 4/043 (2013.01); H01M 4/30 (2013.01); H01M 4/50 (2013.01);
(Continued)

(58) Field of Classification Search
None
See application file for complete search history.

(56) References Cited

U.S. PATENT DOCUMENTS 4,137,627 A 2/1979 Kinsman
5,156,934 A 10/1992 Kainthia et al.
(Continued)

FOREIGN PATENT DOCUMENTS

JP 2008171599 * 7/2008 .......... H01M 10/052
JP 2008171734 * 7/2008 .............. Y02P 70/50
WO 2017136545 A1 8/2017

OTHER PUBLICATIONS

Foreign Communication from a related application—International Search Report and Written Opinion of International Application No. PCT/US2017/016209 dated May 11, 2017, 15 pages.
(Continued)

*Primary Examiner* — Barbara L Gilliam
*Assistant Examiner* — Angela J Martin
(74) *Attorney, Agent, or Firm* — Andrew M. Metrailer; Conley Rose, P.C.

(57) ABSTRACT

A bipolar battery having at least two electrochemical cells electrically arranged in series includes a housing, an electrolyte, a bipolar electrode, an anode, a cathode, and first and second microporous separators. The bipolar electrode comprises a first anode material and a first cathode material. The first cathode and anode materials are disposed on opposite faces of a current collector. The anode comprises a second anode material comprising: a zinc compound, a zinc oxide
(Continued)

compound, and a binder, and the cathode comprises a second cathode material comprising: a manganese oxide, a conductive carbon, and a copper compound. The first cathode material faces the second anode material, and the first anode material faces the second cathode material. The first microporous separator is disposed between the first cathode material and the second anode material, and the second microporous separator is disposed between the first anode material and the second cathode material.

22 Claims, 17 Drawing Sheets

(51) Int. Cl.

| | |
|---|---|
| *H01M 4/30* | (2006.01) |
| *H01M 4/50* | (2010.01) |
| *H01M 4/62* | (2006.01) |
| *H01M 10/28* | (2006.01) |
| *H01M 50/186* | (2021.01) |
| *H01M 50/193* | (2021.01) |

(52) U.S. Cl.
CPC ......... *H01M 4/622* (2013.01); *H01M 10/282* (2013.01); *H01M 50/186* (2021.01); *H01M 50/193* (2021.01)

(56) References Cited

U.S. PATENT DOCUMENTS

| | | | | |
|---|---|---|---|---|
| 5,660,953 | A * | 8/1997 | Bai | H01M 4/502 |
| | | | | 429/50 |
| 5,952,124 | A * | 9/1999 | Kainthla | H01M 4/50 |
| | | | | 429/224 |
| 6,432,585 | B1 * | 8/2002 | Kawakami | H01M 4/80 |
| | | | | 429/235 |
| 6,887,620 | B2 | 5/2005 | Klein et al. | |
| 7,258,949 | B2 | 8/2007 | Frederiksson et al. | |
| 8,481,197 | B2 * | 7/2013 | Sato | H01M 10/0418 |
| | | | | 429/152 |
| 2004/0253512 | A1 * | 12/2004 | Watanabe | H01M 4/131 |
| | | | | 429/185 |
| 2007/0264572 | A1 * | 11/2007 | Zuraw | B22F 1/065 |
| | | | | 420/514 |
| 2009/0233164 | A1 * | 9/2009 | Shimamura | H01M 50/193 |
| | | | | 429/210 |
| 2011/0014520 | A1 * | 1/2011 | Ueda | H01M 10/044 |
| | | | | 429/210 |
| 2011/0274950 | A1 | 11/2011 | Whitacre | |
| 2012/0156559 | A1 | 6/2012 | Davies et al. | |
| 2012/0231323 | A1 * | 9/2012 | Takagi | B32B 27/32 |
| | | | | 428/220 |
| 2013/0095367 | A1 * | 4/2013 | Kim | H01M 50/46 |
| | | | | 429/149 |
| 2014/0239239 | A1 * | 8/2014 | Cha | H01M 4/134 |
| | | | | 525/218 |
| 2014/0248532 | A1 | 9/2014 | Tomantschger | |
| 2014/0349147 | A1 * | 11/2014 | Shaffer | H01M 10/0418 |
| | | | | 429/82 |
| 2015/0140376 | A1 | 5/2015 | Shaffer, II et al. | |
| 2015/0311503 | A1 * | 10/2015 | Ingale | H01M 4/625 |
| | | | | 429/163 |
| 2018/0151910 | A1 * | 5/2018 | Zimmerman | H01M 10/0585 |

OTHER PUBLICATIONS

Foreign Communication from a related application—International Preliminary Report on Patentability of International Application No. PCT/US2017/016209 dated Aug. 16, 2018, 12 pages.
Foreign Communication from a related application—First Examination Report dated Mar. 2, 2021, India Application No. 201817032979.

* cited by examiner

RECHARGEABLE ALKALINE MANGANESE DIOXIDE-ZINC BIPOLAR BATTERIES

CROSS-REFERENCE TO RELATED APPLICATIONS

This application is a filing under 35 U.S.C. 371 as the National Stage of In Application No. PCT/US2017/016209, filed Feb. 2, 2017 and entitled "Rechargeable Alkaline Manganese Dioxide-Zinc Bipolar Batteries," which claims the benefit of and priority to U.S. Provisional Application No. 62/290,161 filed on Feb. 2, 2016 and entitled "Rechargeable Alkaline Manganese Dioxide-Zinc Bipolar Batteries," both of which are incorporated herein by reference in their entirety.

STATEMENT OF FEDERALLY SPONSORED RESEARCH OR DEVELOPMENT

This invention described and claimed herein was made with Government support under grant number DE-AR-0000150 awarded by the U.S. Department of Energy. The U.S. government has certain rights in this invention.

BACKGROUND

Manganese dioxide-zinc ($MnO_2$—Zn) are primarily considered as good primary (one-time use) batteries and commercialized by companies like Duracell, Energizer, etc. The reference to primary batteries (e.g., primary batteries, primary electrochemical cells, or primary cells) means that after a single discharge, the primary batteries are disposed of and replaced. The primary characteristics of these batteries results in frequent disposals and waste buildup in the environment. The reasons for such behavior are due to the excellent economic benefits of the battery where its main components—$MnO_2$ and Zn—are relatively inexpensive. $MnO_2$ and Zn have high theoretical capacities of 617 mAh/g and 820 mAh/g, respectively. The high capacities and the nominal voltage at which the capacity is delivered results in high energy from these alkaline batteries. The cheap raw components and the added bonus of a safe aqueous electrolyte make it an excellent candidate for various high energy and power applications. However, its primary characteristics have relegated it to use in smaller applications like clocks, remotes, etc.

The primary characteristics of the $MnO_2$—Zn batteries are due to inherent materials problems of its raw components, especially $MnO_2$. $MnO_2$ undergoes a 2 electron reduction reaction to deliver its theoretical capacity of 617 mAh/g (1 electron delivers 308 mAh/g). The first electron reaction is a solid state reaction process, where the $MnO_2$ accepts a proton from the electrolyte [potassium hydroxide (KOH)] to form manganese oxyhydroxide (MnOOH) and deliver ~308 mAh/g. The second electron reaction is a dissolution-precipitation reaction, where the $Mn^{3+}$ ions become soluble in alkaline electrolyte and precipitate out as manganese(II) hydroxide [$Mn(OH)_2$] and it delivers ~309 mAh/g. The loss in capacity for the $MnO_2$ electrode is due to the lattice strain experienced during the proton insertion in the $1^{st}$ electron reaction that leads to breakdown of the crystal structure, and the dissolution of the $Mn^{3+}$ ions where the precipitation is dependent on the conductivity of the electrode. Also, the recharge mechanism, where the electrode transitions from $Mn(OH)_2$ to layered-form of $MnO_2$ called birnessite, results in the slow formation of hausmannite ($Mn_3O_4$), which is electrochemically irreversible, and this eventually leads to electrode failure.

SUMMARY

In an embodiment, a bipolar battery having at least two electrochemical cells electrically arranged in series includes a housing, an electrolyte disposed in the housing, a bipolar electrode disposed in the housing, an anode disposed in the housing, a cathode disposed in the housing, and first and second microporous separators. The bipolar electrode comprises a first anode material, and a first cathode material. The first cathode material and the first anode material are disposed on opposite faces of a current collector. The anode comprises a second anode material comprising: a zinc compound, a zinc oxide compound, and a binder, and the cathode comprises a second cathode material comprising: a manganese oxide, a conductive carbon, and a copper compound. The first cathode material of the bipolar electrode faces the second anode material, and the first anode material of the bipolar electrode faces the second cathode material. The first microporous separator is disposed between the first cathode material and the second anode material, and the second microporous separator is disposed between the first anode material and the second cathode material.

In an embodiment, a bipolar battery with at least two cells arranged in series comprises: a cathode comprising a first cathode material, a bipolar electrode comprising a second cathode material and a second anode material, an anode comprising a first anode material, a polymeric separator disposed between the anode, a housing enclosing each of the cathode, the bipolar electrode, the anode, and the polymeric separator, and an electrolyte disposed in the housing. The first cathode material comprises: a manganese oxide compound, a bismuth compound, a conductive carbon, and a copper compound, and the second cathode material and the second anode material are in electrical communication. The second cathode material comprises a manganese oxide compound, a bismuth compound, a conductive carbon, and a copper compound, and the second anode material comprises: a zinc compound, a zinc oxide compound, and a binder. The first anode material comprises: a zinc compound, a zinc oxide compound, and a binder. The separator is disposed between the bipolar electrode and the cathode such that the anode, the bipolar and the cathode are separated from each other.

In an embodiment, a method of producing a bipolar electrode comprises mixing a plurality of anode ingredients to form an anode paste, where the plurality of anode ingredients comprising: one or more zinc compounds; mixing a plurality of cathode ingredients to form a cathode paste, the plurality of cathode ingredients comprising: manganese dioxide and a conductive carbon, simultaneously pressing the cathode paste and anode paste onto opposite sides of a current collector at a pressure between $6.9\times10^6$ and $1.4\times10^8$ Pascals to form a pressed assembly, and drying the pressed assembly to produce the bipolar electrode.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

These and other features will be more clearly understood from the following detailed description taken in conjunction with the accompanying drawings and claims.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. Thus, for further understanding of the invention, reference can be made to the following detailed description, read in connection with the drawings in which.

DETAILED DESCRIPTION

Figure 1B:
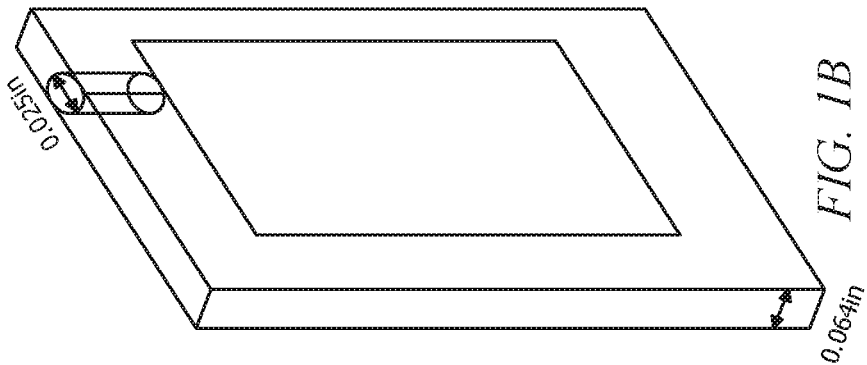
FIG. 1 presents the different views of the prismatic bipolar battery design. The bipolar electrodes, where on the opposite sides of the current collector the cathode and anode material are pressed, are attached to the frames by an adhesive tape. Rubber gaskets are used between each frame to ensure that there is no flow or contact of electrolyte between each chamber. This is important as any contact would make the bipolar battery lose its high voltage characteristics. (a) Front view of the polymer frame with its typical dimensions mentioned. The dimensions can be scaled to meet the requirements of the bipolar battery. (b) Three dimensional side view of the frame that separates each bipolar electrode in the bipolar battery. A hole is shown where the electrolyte is filled through it for each chamber in the bipolar battery. (c) Three dimensional side view of the bipolar battery is shown. The arrangement of the bipolar electrodes is done in a way where the cathode side of one bipolar electrode faces the anode side of the other bipolar electrode till the number of cells that are required are constructed. In the figure a 3 cell prismatic bipolar battery is shown where the arrangement of the electrodes is shown as aforementioned. (d) Two dimensional side view of the prismatic bipolar battery is shown.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," "in some embodiments," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

In this disclosure, the terms "negative electrode" and "anode" are both used to mean "negative electrode." Likewise, the terms "positive electrode" and "cathode" are both used to mean "positive electrode."

In order to address the problems associated with using zinc-manganese dioxide batteries, commercially available rechargeable $MnO_2$—Zn cells have depended on limiting the depth of discharge (DOD) to 5-10% of the $2^{nd}$ electron capacity. Limiting the DOD of the $MnO_2$ limits the capacity obtainable to within the solid-state reaction mechanism, and thus easing the lattice strain experienced by the crystal structure. This method of making the electrode rechargeable limits its actual capability of obtaining high energy density. Recently, it has been discovered that a mixture of copper and bismuth derivatives as additives in the electrode make the $MnO_2$ rechargeable to its complete $2^{nd}$ electron capacity for thousands of cycles. The additives work in tandem to create complexes with the Mn ion in the discharge and charge reactions to limit the formation of $Mn_3O_4$ and enhance the stability of the layered-birnessite phase. The copper ions, for example 2+, is also known to intercalate into the birnessite interlayer to reduce its charge transfer resistance. Thus, the true power of $MnO_2$ cathodes can be obtained to increase the scope of its usage for various applications.

Batteries can be formed from cells that are arranged in series to build up voltages. The cells can be prismatic or cylindrical shaped. Although the cell operation is reliable, the disadvantage of this type of arrangement is that the specific energy density (Wh/kg) is brought down due to the added weight of various packaging components like nuts, bolts, wiring, casings, etc. To mitigate this problem, bipolar batteries can be used, where leaving the end electrodes in a cell, the middle electrodes have a single current collector, where the opposite sides are pressed with cathode and anode materials, and/or are electrically connected. As a single collector having both cathode and anode materials, the electrodes are termed bipolar due to their dualistic electrode characteristics of being positive and negative. The positive face of the bipolar electrode faces the negative face of another electrode until the number of cells are stacked to build up the voltage. Thus, the advantage of bipolar batteries are the ability to construct batteries with high voltage characteristics while simultaneously bringing down the weight, and thus, increase the specific energy density.

Bipolar batteries have been used for other chemistries like lead acid, nickel-cadmium and nickel metal hydride for high power applications. However with the toxicity and the cost associated with these chemistries, it becomes a prudent choice to target alkaline $MnO_2$—Zn chemistry for bipolar batteries. U.S. Pat. No. 4,137,627 reference to a $MnO_2$—Zn battery, and this cell is based on the old Leclanche chemistry where the electrolyte consisted a mixture of ammonium chloride, zinc chloride and mercury chloride. Apart from using a toxic substance like mercury chloride, the cell was built only for primary purposes. Alkaline electrolyte can be used to replace chloride electrolytes as a better substitute as it produces greater power. The application of the $2^{nd}$ electron $MnO_2$ cathodes in the construction of a bipolar electrode could increase the available capacity as the access of the complete $2^{nd}$ electron capacity could deliver specific energy densities from this chemistry as high as or better than lithium-ion energy densities. A combination of 3 $MnO_2$—Zn cells can increase the voltage range of operation to greater than or equal to 4V which is comparable to lithium-ion cells. Realizing the potential of increasing the voltages of $MnO_2$—Zn batteries to lithium-ion batteries can expand its range of applicability to applications like power packs or charger packs, and the like.

Accordingly, an alkaline bipolar battery is described herein, which can be used as a rechargeable alkaline bipolar battery and/or a primary alkaline bipolar battery. These rechargeable cells (also referred to as secondary cells, also known as secondary batteries, secondary electrochemical cells or secondary cells) can provide advantages over primary cells. The bipolar battery includes a cathode material with birnessite-phase manganese dioxide or electrolytic manganese dioxide (EMD) and an anode material with zinc, zinc oxide and a binder. In some embodiments, a bismuth compound, a copper compound selected from the group consisting of elemental copper and copper salt, a conductive carbon and/or a binder may also be included with the cathode material. An advantage that may be realized in the practice of some disclosed embodiments of the battery is that a bipolar $MnO_2$—Zn battery is rendered rechargeable, thereby delivering high energy densities. These batteries, however, could also be used for primary applications.

One of the applications of such a battery can be in power packs or charger packs, where lithium-ion currently dominates. Some embodiments of the bipolar battery design are shown in FIGS. 1, 2, and 3. A prismatic, cylindrical and zigzag designs of the bipolar battery are shown, but the designs are not limited to these forms. A person of ordinary skill in the art, with the benefit of this disclosure, can design various forms of bipolar batteries that fit their suitable application. The bipolar battery comprises of a cathode, an anode, and at least one bipolar electrode. The bipolar electrode comprises of a cathode material and anode material pressed on opposite sides of a current collector. An electrolyte can be dispersed in an open space throughout the battery as shown in FIGS. 1, 2, and 3.

FIGS. 1A-1D present the different views of the prismatic bipolar battery design. The bipolar electrodes can comprise the cathode 165 and anode 167 materials pressed on opposite sides of the current collector 167. The bipolar electrodes can be attached to frames 102 by a seal or attachment mechanism such as an adhesive tape, resin, gasket, or the like. Rubber gaskets can be used between each frame to ensure that there is no flow or contact of electrolyte between each cell formed by an anode and a cathode. The prevention of the contact between the electrolyte between cells allows the bipolar battery to retain its high voltage characteristics. The cells can be assembled within a housing 150 that holds the frames in compression to help maintain the seal between the cells.

Figure 1A:
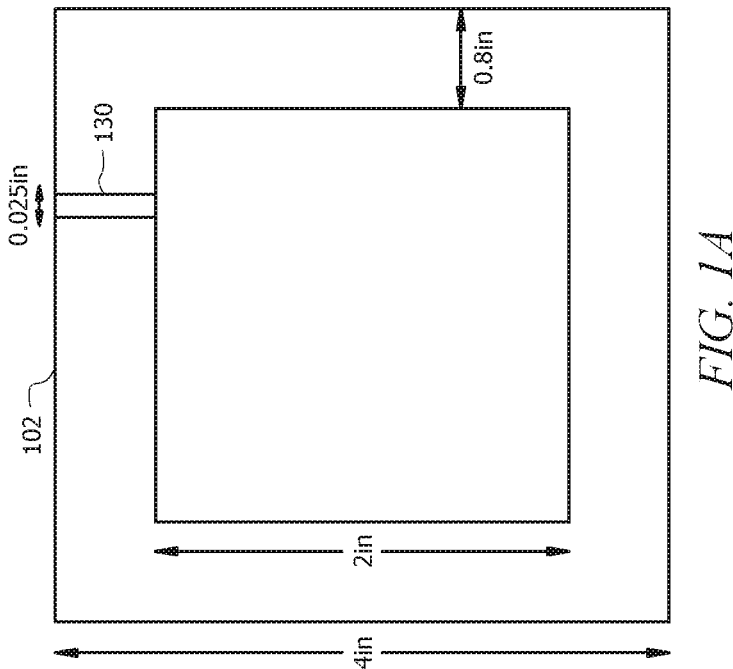

FIG. 1A illustrates a front view of the frame 102. The frame can be formed of any suitable material and will typically be inert with respect to the electrolyte and the cell chemistry. In some embodiments, the frame can be formed of a polymer such as poly(methyl methacrylate), polyvinyl chloride, polystyrene, polycarbonate, polyethylene terephthalate, low density polyethylene, high density polyethylene, ultra-high-molecular-weight polyethylene, very-high-molecular-weight polyethylene, polytetrafluoroethylene, polyester, polyimide, polysulfone, polyphenylene sulfide and polyvinylidene fluoride.

As described in more detail herein, the electrodes and cells may be in a prismatic geometry/configurations well as other, non-prismatic designs can also be used. For example, a cylindrical or other design can also be used with the appropriate configuration of the electrodes and separator. The frame can have any suitable dimensions for separating the anode and cathode within a cell. In some embodiments, the frame can be between about 1 to 10 inches in heights, between about 1 to 8 inches in length, and between about 0.01 and about 1 inch in width. While exemplary dimensions are included herein, the dimensions can be scaled to meet the requirements of the bipolar battery in a given use, as would be understood by one of ordinary skill in the art with the benefit of this disclosure.

Figures 1C, 1D:
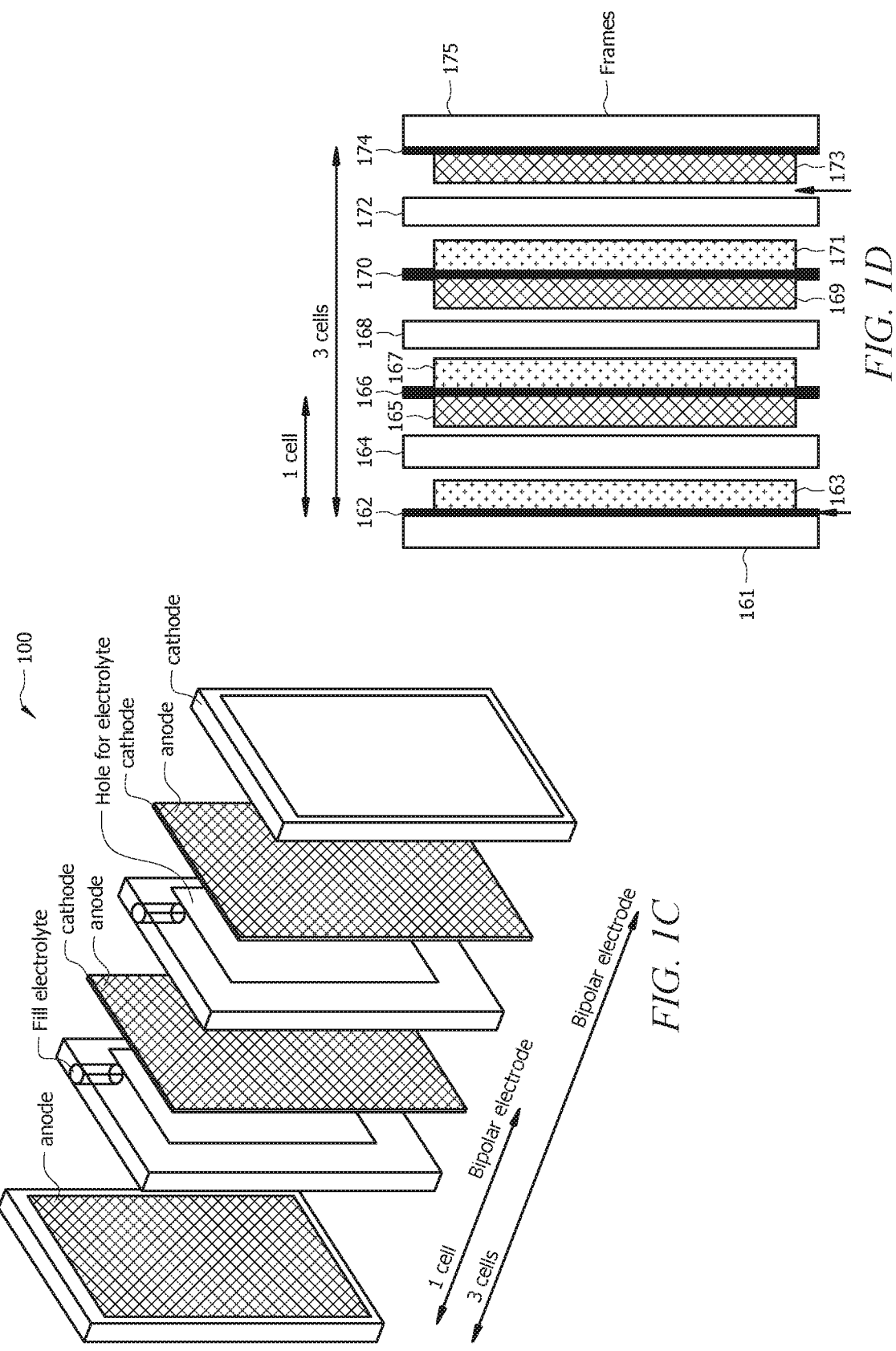

As shown in FIGS. 1A-1C, the frame 102 can have an interior space that can be filled with electrolyte, for example using a fill hole 130. The frame 102 can then be configured to retain the electrolyte in contact with the anode 108 and an adjacent cathode 110 to form an electrochemical cell. Each frame in the bipolar battery 100 can have a separate fill hole 130 as each cell can be sealed from each adjacent cell.

As shown in FIGS. 1C and 1D, the arrangement of the bipolar electrodes is done in a way where the cathode side of one bipolar electrode faces the anode side of the other bipolar electrode until the number of cells that are required are formed. An individual end cathode can be placed in a cell with an anode of a bipolar electrode on one end and an individual end anode can be placed in a cell with a cathode of a bipolar electrode on a second end of the electrode stack so that a plurality of cells, each having an anode and cathode, are formed within the bipolar battery 100.

The cathode material used in one or more of the plurality of cathodes of the plurality of cells can include a mixture of $MnO_2$, carbon, and certain additives and binders depending on the depth of discharge (DOD) that is expected out of the bipolar battery. Applications where a DOD of 0-40% of the $2^{nd}$ electron capacity is expected, the cathode formulation can comprise $MnO_2$, carbon, and binder. Applications where a DOD of 20-100% of the $2^{nd}$ electron capacity is expected, the cathode formulation can comprise $MnO_2$, carbon, bismuth, and copper additives, and optionally, a binder. The cathode material can be based on one or more polymorphs of $MnO_2$, including electrolytic (EMD), $\alpha$-$MnO_2$, $\beta$-$MnO_2$, $\gamma$-$MnO_2$, $\delta$-$MnO_2$, $\epsilon$-$MnO_2$, or $\lambda$-$MnO_2$. In general, if the DOD is limited to 0-40% of the $2^{nd}$ electron capacity then the cycled form of $MnO_2$ remains the form that was used as a starting material. For example, if EMD is used then the cycled form remains as EMD. When the DOD is 40-100% of the $2^{nd}$ electron capacity, then the cycled form of $MnO_2$ in the cathode is $\delta$-$MnO_2$, which is interchangeably referred to as birnessite. If non-birnessite polymorphic forms of manganese dioxide are used, these are converted to birnessite in-situ by one or more conditioning cycles (e.g., charging and discharging) to the full $2^{nd}$ electron capacity.

For bipolar batteries, where DOD of $MnO_2$ is limited to 0-40% of the $2^{nd}$ electron capacity, the cathode comprises of 0-50 wt % carbon, 0-10 wt % binder and the balance EMD or $MnO_2$. In embodiments, where DOD of $MnO_2$ is between 20-100% of the $2^{nd}$ electron capacity, the cathode comprises of 2-50 wt % conductive carbon, 0-30 wt % conductive metal additive, 1-70 wt % copper compound, 1-20 wt % bismuth compound, 0-10 wt % binder and the balance birnessite or EMD.

The bipolar battery, where accessing the $2^{nd}$ electron capacity is the objective, the cathode can comprise a bismuth compound and/or copper as an additive, which together allow galvanostatic battery cycling of the cathode. The bismuth compound can be incorporated into the cathode as an inorganic or organic salt of bismuth (oxidation states 5, 4, 3, 2, or 1), as a bismuth oxide, or as bismuth metal (i.e. elemental bismuth). The bismuth compound can be present in the cathode material at a concentration between 1-20 wt %. Examples of inorganic bismuth compounds include, but are not limited to, bismuth chloride, bismuth bromide, bismuth fluoride, bismuth iodide, bismuth sulfate, bismuth nitrate, bismuth trichloride, bismuth citrate, bismuth telluride, bismuth selenide, bismuth subsalicylate, bismuth neodecanoate, bismuth carbonate, bismuth subgallate, bismuth strontium calcium copper oxide, bismuth acetate, bismuth trifluoromethanesulfonate, bismuth nitrate oxide, bismuth gallate hydrate, bismuth phosphate, bismuth cobalt zinc oxide, bismuth sulphite agar, bismuth oxychloride, bismuth aluminate hydrate, bismuth tungsten oxide, bismuth lead strontium calcium copper oxide, bismuth antimonide, bismuth antimony telluride, bismuth oxide yittia stabilized, bismuth-lead alloy, ammonium bismuth citrate, 2-napthol bismuth salt, duchloritri(o-tolyl)bismuth, dichlordiphenyl(p-tolyl)bismuth, triphenylbismuth.

The copper compound can be incorporated into the cathode as an organic or inorganic salt of copper (oxidation states 1, 2, 3 or 4), as a copper oxide, or as copper metal (i.e. elemental copper). The copper compound can be present in a concentration between 1-70 wt %. In some embodiments, the copper compound can be present in a concentration between 5-50 wt %. In other embodiments, the copper compound can be present in a concentration between 10-50 wt %. In yet other embodiments, the copper compound can be present in a concentration between 5-20 wt %. Examples of copper compounds include, but are not limited to, copper and copper salts such as copper aluminum oxide, copper (I) oxide, copper (II) oxide and/or copper salts in a +1, +2, +3, or +4 oxidation state including, but not limited to, copper nitrate, copper sulfate, copper chloride, etc. In some embodiments, the copper can be added as material, alone or in combination with other copper compounds, including, but not limited to: a gliding metal, cartridge brass, phosphor bronze, yellow or high brass, manganese bronze, naval brass, muntz metal, aluminium bronze, beryllium copper, free-cutting brass, nickel silver, cupronickel, ounce metal, compositional metal, gunmetal or red brass. In some embodiments, the copper can be added in the electrolyte and/or as part of the current collector (e.g., as a coating, plating, or used to form the current collector as described in more detail herein). The copper can be added in a number of forms including as a powder. The effect of copper is to alter the complexing mechanism of Mn ions and also reduce the charge transfer resistance of birnessite by intercalating into its interlayers. This results in a cathode with full or substantially full reversibility during galvanostatic cycling, as compared to a bismuth-modified $MnO_2$ which will not withstand galvanostatic cycling.

When $MnO_2$, bismuth and copper are present in the cathode material, the mass ratio of bismuth oxide to that of the $MnO_2$ can be in the range of about 0.1 to about 0.3, or between about 0.15 to about 0.25, or between about 0.18 to about 0.22. The mass ratio of bismuth oxide to copper and a conductive additive (e.g., carbon nanotubes, etc.) can be between about 0.1 to about 0.25, or between about 0.15 to about 0.2, or between about 0.16 to about 0.18.

The addition of the conductive carbon enables high loadings of $MnO_2$ in the mixed material, resulting in high volumetric and gravimetric energy density. The conductive carbon can be present in a concentration between 0-50 wt % for the 0-40% DOD cells and 2-50 wt % for the $2^{nd}$ electron cells. Such conductive carbon can include single walled carbon nanotubes, multiwalled carbon nanotubes, graphene, carbon blacks of various surface areas, and others that have specifically very high surface area and conductivity. Higher loadings of the $MnO_2$ in the mixed material electrode are, in some embodiments, desirable to increase the energy density. Other examples of conductive carbon include TIMREX Primary Synthetic Graphite (all types), TIMREX Natural Flake Graphite (all types), TIMREX MB, MK, MX, KC, B, LB Grades (examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPER P, SUPER P Li, carbon black (examples include Ketjenblack EC-300J, Ketjenblack EC-600JD, Ketjenblack EC-600JD powder), acetylene black, carbon nanotubes (single or multi-walled), graphene, graphyne, graphene oxide, Zenyatta graphite and combinations thereof.

The addition of conductive metal additives to the cathode provides another possibility for increasing the conductivity of the electrode by electroplating metals like Ni and Cu on the cathode mixture. The conductive metal additive can be present in a concentration of 0-30 wt %. The conductive metal additive may be, for example, nickel, copper, silver, gold, brass, bronze, cobalt, nickel-cobalt, tin and aluminum. The conductive metal additive can be plated using an electroless plating solution, where a reducing agent reduces the conductive metal ions in the solution onto the cathode mix or $MnO_2$. The electroless plating method does not require any power source or anode to plate the conductive metal ions. A second conductive metal additive is added to act as a supportive conductive backbone for the first and second electron reactions to take place. The second electron reaction has a dissolution-precipitation reaction where $Mn^{3+}$ ions become soluble in the electrolyte and precipitate out on the graphite resulting in an electrochemical reaction and the formation of manganese hydroxide $[Mn(OH)_2]$ which is non-conductive. This ultimately results in a capacity fade in subsequent cycles. Suitable additional conductive metal additives can include transition metals like Ni, Co, Fe, Ti, V, and metals like Ag, Au, Al, Ca, as well as derivative thereof (e.g., salts, etc.), and any combinations thereof. Transition metals like Co may also help in reducing the solubility of $Mn^{3+}$ ions. In some embodiments, the additional conductive metal additives can be present in the form of metallic salts, which can include, but are not limited to, aluminum hydroxide, aluminum oxide, aluminum oxinate, aluminum monostearate, aluminum hydroxide hydrate, aluminum silicate, bismuth aluminate hydrate, aluminum titanate, strontium aluminate, lithium aluminate, strontium lanthanum aluminate, zinc aluminum hydroxide, magnesium aluminum hydroxide, layered double hydroxides containing aluminum and carbonates, sodium aluminate and yttrium aluminum oxide, or iron, iron hydroxide, iron hydroxide hydrate, iron oxide, manganese iron oxide, copper iron oxide, zinc iron oxide, nickel zinc iron oxide, copper zinc iron oxide, barium ferrite or alloys of aluminum and iron, tin, tin oxide, indium tin oxide, antimony tin oxide, potassium stannate hydrate, stannous hydroxide, vanadium oxide, vanadium oxytriethoxide, vanadium oxyfluoride, nickel-vanadium alloy, or any combination thereof. Such conductive metal additive(s) may be incorporated into the electrode by chemical means or by physical means (e.g. ball milling, mortar/pestle, spex mixture). Transition metals like Co also help in reducing the solubility of $Mn^{3+}$ ions.

In some embodiments, the cathode material can include an optional binder. The binder can be present in an amount of between about 0.01 wt. % to about 10 wt. %. In an embodiment, the binder comprises a water-soluble cellulose-based hydrogel, which are used as thickeners and strong binders, and are cross-linked with good mechanical strength with conductive polymers. The binder may also be a cellulose film sold as cellophane. In some embodiments, the cellulose-based hydrogel can be a water-based cellulose that is water soluble and biocompatible and can be used as a thickener, a binding agent, a lubricant, an emulsifier, a stabilizer and a suspension aid. The cellulose-based hydrogel can include, but is not limited to, methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC).

The binders can be made by physically cross-linking the water-soluble cellulose-based hydrogels with a polymer through repeated cooling and thawing cycles. In some embodiments, a carboxymethyl cellulose (CMC) solution in an amount between about 0.01 wt. % and about 10 wt. % can be cross-linked with between about 0.01 wt. % and about 10 wt. % polyvinyl alcohol (PVA) on an equal volume basis. The binder, compared to TEFLON®, shows superior performance. TEFLON® is a very resistive material, but its use in the industry has been widespread due to its good rollable properties. In some embodiments, the binder is free of polytetrafluoroethylene (e.g., free of TEFLON). This, however, does not rule out using TEFLON® as a binder.

Mixtures of TEFLON® with the aqueous binder and some conductive carbon can be used to create rollable binders.

The binder can include hydrogels (including any of those noted herein). Examples of crosslinking polymers include polyvinyl alcohol, polyvinylacetate, polyaniline, polyvinylpyrrolidone, polyvinylidene fluoride and polypyrrole. In an embodiment, a 0.01 wt. % to10 wt % solution of water-cased cellulose hydrogen is cross linked with a 0.01 wt. % to 10% wt solution of crosslinking polymers by, for example, repeated freeze/thaw cycles, radiation treatment or chemical agents (e.g. epichlorohydrin). The aqueous binder may be mixed with between about 0.01 wt % and about 5 wt. % TEFLON® to improve manufacturability.

In an embodiment, the anode material can be a mixture of Zn, zinc oxide (ZnO), binder and certain additives like bismuth and indium in trace concentrations. The electrode can comprise 0-30% zinc oxide, 0-10% binder, and the balance zinc.

In some embodiments, the anode material can comprise zinc, which can be present as elemental zinc and/or zine oxide. In some embodiments, the Zn anode mixture comprises Zn, zinc oxide (ZnO), an electronically conductive material, and a binder. The Zn may be present in the anode material 5 in an amount of from about 50 wt. % to about 90 wt. %, alternatively from about 60 wt. % to about 80 wt. %, or alternatively from about 65 wt. % to about 75 wt. %, based on the total weight of the anode material. In an embodiment, Zn may be present in an amount of about 85 wt. %, based on the total weight of the anode material.

In some embodiments, ZnO may be present in an amount of from about 5 wt. % to about 20 wt. %, alternatively from about 5 wt. % to about 15 wt. %, or alternatively from about 5 wt. % to about 10 wt. %, based on the total weight of anode material. In an embodiment, ZnO may be present in anode material in an amount of about 10 wt. %, based on the total weight of the anode material. As will be appreciated by one of skill in the art, and with the help of this disclosure, the purpose of the ZnO in the anode mixture is to provide a source of Zn during the recharging steps, and the zinc present can be converted between zinc and zinc oxide during charging and discharging phases.

In an embodiment, an electrically conductive material may be present in the anode material in an amount of from about 5 wt. % to about 20 wt. %, alternatively from about 5 wt. % to about 15 wt. %, or alternatively from about 5 wt. % to about 10 wt. %, based on the total weight of the anode material. In an embodiment, the electrically conductive material may be present in anode material in an amount of about 10 wt. %, based on the total weight of the anode material. As will be appreciated by one of skill in the art, and with the help of this disclosure, the electrically conductive material is used in the Zn anode mixture as a conducting agent, e.g., to enhance the overall electric conductivity of the Zn anode mixture. Nonlimiting examples of electrically conductive material suitable for use in in this disclosure include any of the conductive carbons described herein such as carbon, graphite, graphite powder, graphite powder flakes, graphite powder spheroids, carbon black, activated carbon, conductive carbon, amorphous carbon, glassy carbon, and the like, or combinations thereof. The conductive material can also comprise any of the conductive carbon materials described with respect to the cathode material including, but not limited to, acetylene black, single walled carbon nanotubes, multi-walled carbon nanotubes, graphene, graphyne, or any combinations thereof The anode material may also comprise a binder. Generally, a binder functions to hold the electroactive material particles (e.g., Zn used in anode, etc.) together and in contact with the current collector. The binder is present in a concentration of 0-10 wt %. The binders may comprise water-soluble cellulose-based hydrogels like methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC), which were used as thickeners and strong binders, and have been cross-linked with good mechanical strength and with conductive polymers like polyvinyl alcohol, polyvinylacetate, polyaniline, polyvinylpyrrolidone, polyvinylidene fluoride and polypyrrole. The binder may also be a cellulose film sold as cellophane. The binder may also be TEFLON®, which is a very resistive material, but its use in the industry has been widespread due to its good rollable properties. The 0-40% DOD bipolar batteries use TEFLON as the binder as it does not hamper conductivity too much within the 0-40% DOD region. TEFLON has negative effects on the cathode when $2^{nd}$ electron capacity is tried to be obtained. This, however, does not rule out using TEFLON® as a binder. Mixtures of TEFLON® with the aqueous binder and some conductive carbon can be used to create rollable binders for $2^{nd}$ electron bipolar batteries.

In some embodiments, the binder may be present in anode material in an amount of from about 2 wt. % to about 10 wt. %, alternatively from about 2 wt. % to about 7 wt. %, or alternatively from about 4 wt. % to about 6 wt. %, based on the total weight of the anode material. In an embodiment, the binder may be present in anode material in an amount of about 5 wt. %, based on the total weight of the anode material.

A current collector can be used with an anode, a cathode, or any of the bipolar electrodes. For the anode and cathode at the ends of the electrode stack, the anode material and/or the cathode material can be pressed to the current collector. In general, the current collector acts as an electron carrier and a surface upon which the anode material and/or the cathode material can be deposited during charging of the battery. In some embodiments, the current collector comprises a porous metal collector further comprising a variety of collector configurations, such as for example a metal conductive mesh, a metal conductive interwoven mesh, a metal conductive expanded mesh, a metal conductive screen, a metal conductive plate, a metal conductive foil, a metal conductive perforated plate, a metal conductive perforated foil, a metal conductive perforated sheet, a sintered porous metal conductive sheet, a sintered metal conductive foam, an expanded conductive metal, a perforated conductive metal, and the like, or combinations thereof. Other porous collector configurations of the current collector will be appreciated by one of skill in the art in light of this disclosure. In some embodiments, the current collector can comprise a metal collector pocketed assembly. The current collector can comprise silver, bismuth, copper, cadmium, lead, iron, nickel, nickel-coated steel, indium, tin, tin-coated steel, silver coated copper, copper plated nickel, nickel plated copper, or any combinations of these metals including coated metals and/or alloys. Other current collector configurations will be apparent to one of skill in the art, and with the help of this disclosure.

For the bi-polar electrodes, the current collector can generally comprise a non-porous structure in order to prevent electrolyte contact between adjacent cells. In some embodiments, the current collector for the bipolar electrodes can be a metal conductive plate, a metal conductive foil, a metal conductive sheet, a sintered metal plate or sheet, or the like, or combinations thereof.

In some embodiments, a plurality of current collectors can be used, including any of the current collectors described herein. For example, a cathode material or an anode material can be pressed into a perforated or porous current collector (e.g., a mesh, foam, etc.), and the resulting cathode or anode can be electrically and/or mechanically coupled to a non-porous current collector. The use of a porous current collector as a layer can be referred to as a support in some contexts. The support used with the cathode material can comprise copper, for example by being formed from copper, a copper alloy, or a copper plated or coated material. For example a bipolar electrode can be formed by pressing a cathode material onto a conductive mesh (e.g., as an electrically conductive support), and the resulting cathode can be pressed onto a current collector foil. Alternatively, the pressed cathode material with the conductive mesh can have the conductive mesh welded or otherwise electrically coupled to the current collector foil. For example, a current collector tab can be connected to the conductive mesh and welded to the current collector foil. A corresponding anode material can be pressed into a mesh (e.g., forming a support) and mechanically and/or electrically coupled to an opposite side of the current collector foil. This provides a bipolar electrode having to conductive meshes and a central, non-porous current collector foil that serves as both a current collector and electrolyte barrier or seal.

For the bi-polar electrodes, the current collector may form a portion of the seal between the adjacent cells. For example, the current collector can be sealed to the frame, and the cathode material and/or the anode material can be adhered to the current collector within the opening of the frame. As a result, the seal between the current collector and the frame on a first side, and the frame 102 and a second current collector on a second side of the frame would form the seal for the cell. In this instance, the first current collector would be electrically coupled to a cathode or anode material, and the second current collector would be electrically coupled to a corresponding anode or cathode material, respectively, so that a sealed cell comprising a cathode material, an anode material, and an electrolyte is formed. Thus, the current collector for the bi-polar cell can form a portion of the seal between the cells as well as providing electrical contact between the adjacent cells to provide for a higher voltage out of the bipolar battery than would otherwise be provided by a single cell.

In some embodiments, the current collector of any of the electrodes may further comprise a current collector tab. In such embodiment, the current collector tab may comprise a metal, nickel, copper, steel, and the like, or combinations thereof. Generally, the current collector tab provides a means of connecting the electrode to the electrical circuit of the battery. In an embodiment, the current collector tab is in electrical contact with an outer surface of the electrode. In an embodiment, the current collector tab is in electrical contact with less than about 0.2% of an outer surface of the electrode, alternatively less than about 0.5%, or alternatively less than about 1%.

The current collector tab can be used as one form of electrical connection between a current collector for an anode or cathode and non-porous current collector material such as a foil for the bipolar electrodes. In these embodiments, the current collector tab can be used to electrically couple a porous current collector to the non-porous current collector. For example, the current collector tab can be electrically coupled to the mesh and the current collector tab can then be welded or otherwise electrically coupled to the current collector foil.

The cathode material and/or anode materials can be adhered to a corresponding current collector by pressing at, for example, a pressure between 1,000 psi and 20,000 psi (between $6.9 \times 10^6$ and $1.4 \times 10^8$ Pascals). The cathode and anode materials may be adhered to the current collector as a paste. A tab of each current collector, when present, can extend outside of the device to form the current collector tab.

The resulting cathode and anode may have a porosity in the range of 20%-85% as determined by mercury infiltration porosimetry. In one embodiment, the porosity is measured according to ASTM D4284-12 "Standard Test Method for Determining Pore Volume Distribution of Catalysts and Catalyst Carriers by Mercury Intrusion Porosimetry.

An alkaline electrolyte (e.g. an alkaline hydroxide, such as NaOH, KOH, LiOH, or mixtures thereof) can be contained within the free spaces of the electrodes. The electrolyte may have a concentration of between 5% and 50% w/w. The non-flow rechargeable zinc-anode battery base electrolyte may comprise an acidic electrolyte, zinc sulfate or zinc chloride. The pH of the electrolyte can vary from 0-15. The electrolyte can be in a liquid or gelled form. When the electrolyte is in the form of a gel, the gelled electrolyte can be formed by mixing a cellulose derivative and an alkaline solution.

The bipolar battery can also comprise a separator. The separator forms an electrically insulating barrier between the anode and the cathode while being porous to hold the electrolyte and allow for ionic flow in the electrolyte between the electrodes. By being placed between the electrodes, the separator serves to prevent shorting that could occur due to direct electrical contact between the electrodes. As will be appreciated by one of skill in the art, the separator allows the electrolyte, or at least a portion and/or component thereof, to pass (e.g., cross, traverse, etc.) through the electrode separator membrane, to balance ionic flow and sustain the flow of electrons in the battery. In this regard, the separator serves to demarcate the cathode from the anode.

The separator 3 may comprise one or more layers. Suitable layers can include, but are not limited to, a polymeric separator layer such as a sintered polymer film membrane, polyolefin membrane, a polyolefin nonwoven membrane, a cellulose membrane, a cellophane, a battery-grade cellophane, a hydrophilically modified polyolefin membrane, and the like, or combinations thereof. As used herein, the phrase "hydrophilically modified" refers to a material whose contact angle with water is less than 45°. In another embodiment, the contact angle with water is less than 30°. In yet another embodiment, the contact angle with water is less than 20°. The polyolefin may be modified by, for example, the addition of TRITON X-100™ or oxygen plasma treatment. In some embodiments, the separator 3 can comprise a CELGARD® brand microporous separator. In an embodiment, the separator 3 can comprise a FS 2192 SG membrane, which is a polyolefin nonwoven membrane commercially available from Freudenberg, Germany.

The layers can be present in a variety of configurations. In some embodiments, one or more of the layers can be wrapped around the anode and/or cathode. In some embodiments, a multi-layer structure can be used between the electrodes, where a portion of any one or more of the layers can optionally extend around one or more of the electrodes.

In some embodiments, the bipolar battery can also include a gas recombiner or a gas trapper that traps gas bubbles in the electrolyte. The gas recombiner can serve to convert any gas evolved from the electrodes back into a reaction product that is a liquid or can be dissolved in the electrolyte. In some embodiments, the gas recombiner can be in the form of calcium, magnesion, aliminum, thixotropic silic acid, and/or palladium mixed with electrode materials.

The bipolar batteries were tested with zinc anodes. However, many other anodes can be used in the bipolar design with $MnO_2$ like nickel oxyhydroxide (NiOOH), iron, cadmium, aluminium and metal hydride (MH). A battery with a zinc negative electrode produces a significant and useful cell voltage enabling its use as a secondary battery. However, zinc ions in the electrolyte are known to have a deleterious effect on the $MnO_2$ cathode. Hence, in the bipolar batteries additional measures can be used to avoid the deleterious effect and protect the $MnO_2$ cathode. One method used was a wrapped electrode design of the cathode. A second method used was utilizing CELGARD® brand microporous separator.

In general, the cathode can be formed by mixing multiple ingredients to form a cathode paste, where the multiple ingredients comprise a manganese oxide compound, and a conductive carbon. The cathode paste can be pressed onto a current collector at a pressure between $6.9 \times 10^6$ and $1.4 \times 10^8$ Pascals to form a pressed assembly, and the pressed assembly can be dried to produce the cathode. The current collector can include any of the materials described herein. For example, the current collector can comprise nickel or a coated nickel.

In an embodiment, the cathode can be formed by mixing multiple ingredients to form a cathode paste. The ingredients can include any of those described herein as being used with the cathode and/or cathode material. In an embodiment, the mixture forming the paste can comprise a manganese oxide compound selected from the group consisting of birnessite-phase manganese dioxide ($\delta$-$MnO_2$) and electrolytic manganese dioxide (EMD), a bismuth compound selected from the group consisting of elemental bismuth and a bismuth salt, and a copper compound selected from the group consisting of elemental copper and a copper salt. The resulting cathode paste can be pressed onto a cathode current collector, for example at a pressure between $6.9 \times 10^6$ and $1.4 \times 10^8$ Pascals, to form a pressed assembly. The pressed assembly can then be dried to produce a cathode. In some embodiments, the paste can also include a binder and a conductive material such as conductive carbon.

In an embodiment, a cathode can be produced by mixing multiple ingredients to form a cathode paste. The multiple ingredients can comprise a manganese oxide compound selected from the group consisting of birnessite-phase manganese dioxide ($\delta$-$MnO_2$) and electrolytic manganese dioxide (EMD), a bismuth compound selected from the group consisting of elemental bismuth and a bismuth salt, and a conductive carbon. The cathode paste can be simultaneously pressed onto a cathode current collector and onto a substrate of elemental copper at a pressure between $6.9 \times 10^6$ and $1.4 \times 10^8$ Pascals to form a pressed assembly. The pressed assembly can then be dried to produce a cathode.

In an embodiment, an anode can be produced by mixing multiple ingredients to form an anode paste. The multiple ingredients can comprise a zinc compound with trace elements of bismuth and indium and a zinc oxide compound. The anode paste can be pressed onto a current collector at a pressure between $6.9 \times 10^6$ and $1.4 \times 10^8$ Pascals to form a pressed assembly, and the pressed assembly can be dried to produce an anode. The ingredients for the anode paste can also include a binder. The resulting cathode and anode can be a single end electrode in the electrode stack or different sides of a bipolar electrode.

In an embodiment, a bipolar electrode can be produced by mixing multiple ingredients to form an anode paste, where the multiple ingredients can include a zinc compound with trace elements of bismuth and indium, and a zinc oxide compound. Multiple ingredients can then be mixed or combined to form a cathode paste, where the multiple ingredients can include manganese dioxide and a conductive carbon. The cathode paste and anode paste can be simultaneously pressed onto opposite sides of a current collector at a pressure between $6.9 \times 10^6$ and $1.4 \times 10^8$ Pascals to form a pressed assembly, which can then be dried to produce a bipolar electrode.

In some embodiments, the bipolar electrodes can be produced by mixing multiple ingredients to form an anode paste, where the multiple ingredients include a zinc compound with trace elements of bismuth and indium, a zinc oxide compound, and a binder. Multiple ingredients can also be mixed to form a cathode paste, where the multiple ingredients include electrolytic manganese dioxide (EMD), a conductive carbon, a bismuth such as elemental bismuth and/or a bismuth salt, and a copper compound such as elemental copper and/or a copper salt. The cathode paste and anode paste can be pressed (e.g., simultaneously pressed) onto opposite sides of a bipolar current collector at a pressure between $6.9 \times 10^6$ and $1.4 \times 10^8$ Pascals to form a pressed assembly, which can then be dried to form the bipolar electrode.

In some embodiments, the cathode paste can also include a conductive carbon and/or any of the other components described herein. The bipolar current collector can include nickel and/or a substrate of elemental copper.

As shown in FIGS. 1C and 1D, an embodiment of the bipolar battery can be constructed from a plurality of electrodes and frames. Referring to FIG. 1D, a first anode 163 can be disposed adjacent to an end frame 161. A current collector 162 can be coupled between the end frame 161 and the anode 163. The anode 163 can be wrapped in a separator and/or have a separator disposed adjacent thereto (e.g., as part of the second frame 164). A second frame 164 can be disposed between the anode 163 and bipolar electrode having a cathode 165 facing the anode 163. The bipolar electrode can be formed using any of the materials and techniques described herein. A central current collector 167 can be disposed between the cathode 165 and anode 167 on the bipolar electrode, where the cathode 165 and/or anode 167 can optionally comprise an additional current collector material. A third frame 168 can be disposed between the anode 167 and a cathode 169 of a second bipolar electrode. A current collector 170 can be disposed between the cathode 169 and an anode 171 of the second bipolar electrode. A third frame 172 can be disposed between the anode 171 and an end cathode 173. The end cathode can be electrically coupled to a current collector 175 and be disposed adjacent to a fourth frame 174.

Once assembled, a housing 150 can be used to compress the stack together to help maintain the seals between the cells. Once compressed, a first cell can be formed between the current collector 162, the second frame 164 and the current collector 166. A second cell can be formed between the current collector 166, the third frame 168, and the current collector 170. A fourth cell can be formed between the current collector 170, the fourth frame 172, and the current collector 174. Each of the first cell, the second cell, and the third cell can be sealed so that an electrolyte placed into the respective cell would not contact an electrolyte in another cell. Since the cells are electrically connected in series, the voltage from each cell can add to provide the final voltage output from the bipolar battery between the end electrodes (e.g., between current collector 162 and current collector 174). Further, while three cells are shown in series in FIGS. 1C and 1D, only two cells or four or more cells can be arranged in series to provide a desired output voltage across the bipolar battery.

In some embodiments, the capacity of each cell arranged in series can be approximately the same. This can be configured so that each electrode of the plurality of electrodes is configured to be approximately the same size and shape and/or have approximately the same amount of the cathode material and/or anode material. For example, the cathodes in each cell arranged in series may comprise approximately the same amount and composition of the cathode material, and the anodes in each cell arranged in series may comprise approximately the same amount and composition of the anode material. In some embodiments, the composition and/or amount of material may change between the cells.

Figure 2A:
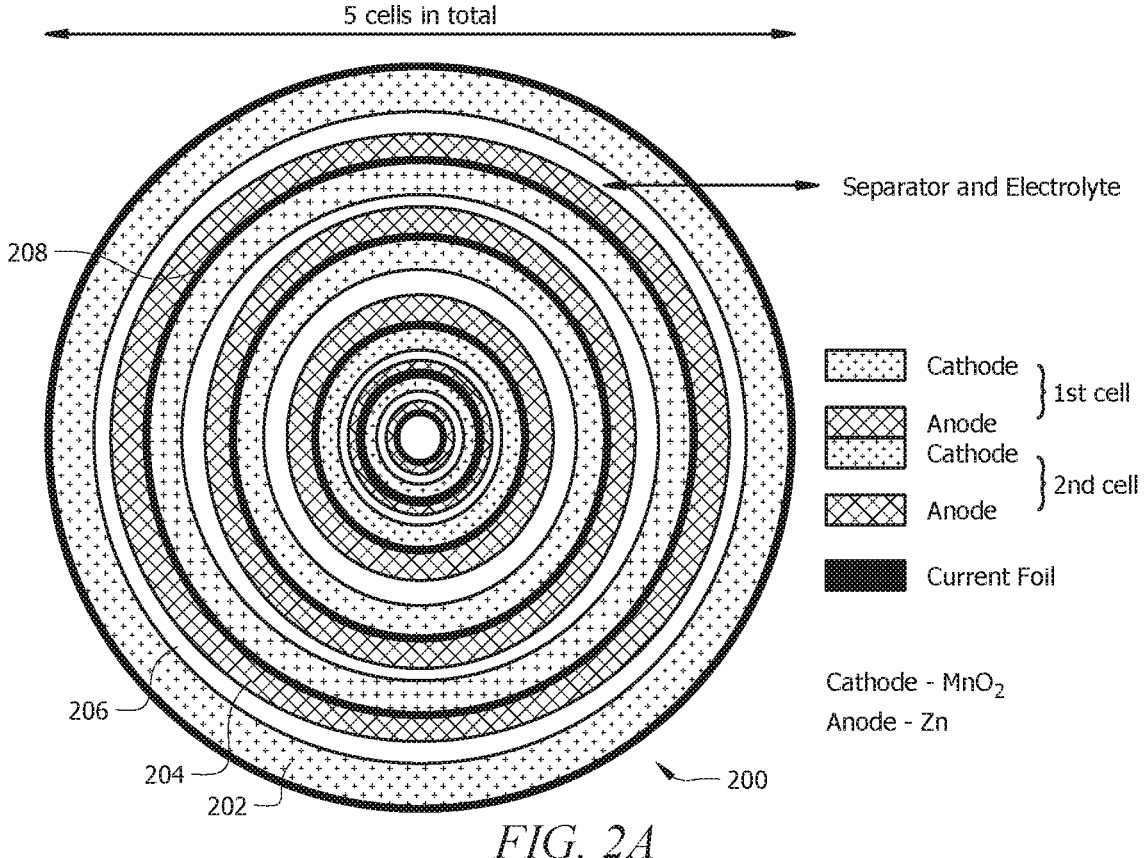
FIGS. 2A and 2B present top views of a cylindrical bipolar battery. The cathodes, anodes and the bipolar electrodes are spirally coiled and fitted inside the cylindrical can. The electrolyte is filled inside the cylindrical can with care so that there is no contact of electrode between each cell. A 5 cell cylindrical bipolar battery is shown in the example figure showing the capability of achieving >7V of operating voltage.
Figure 2B:
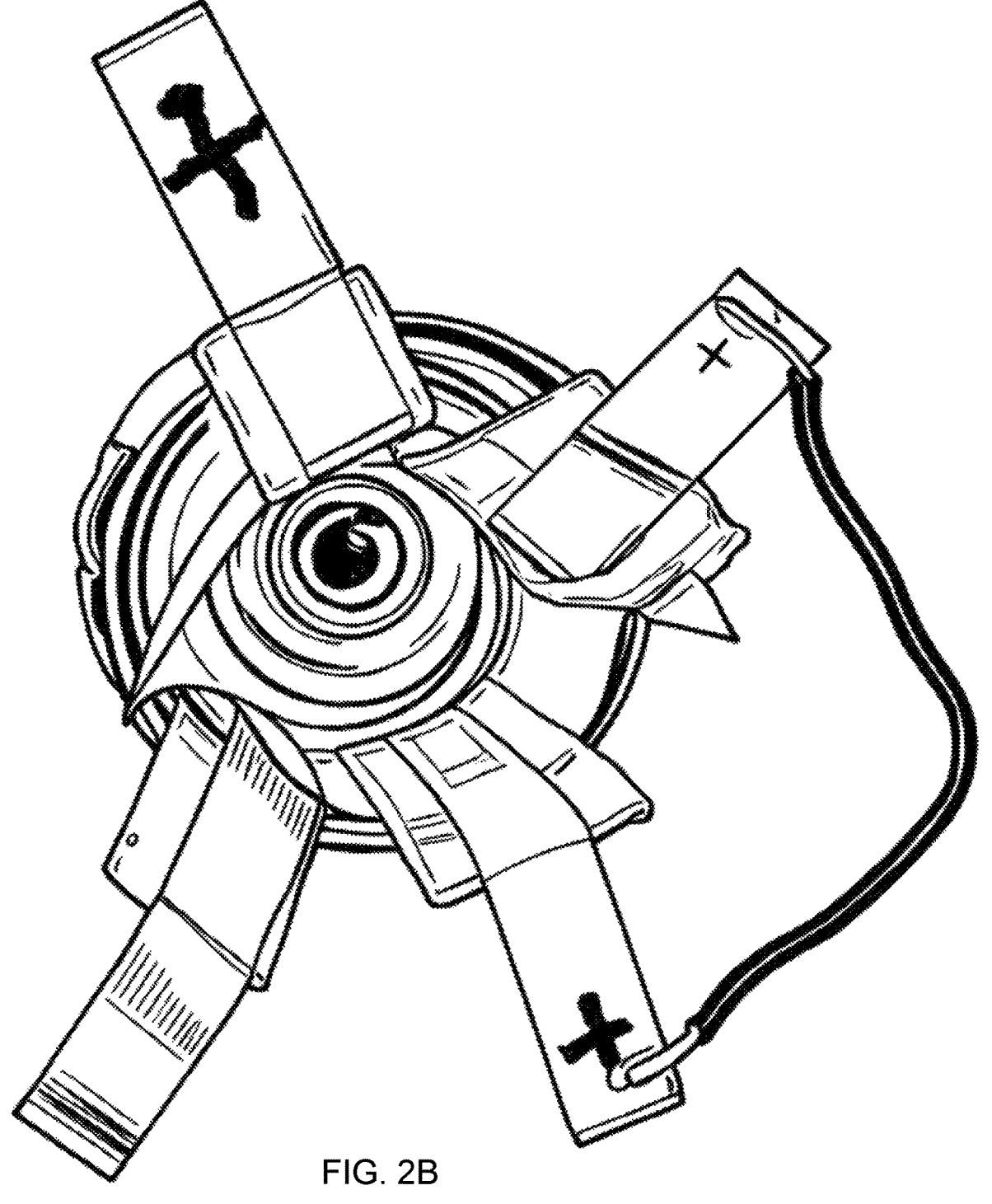
Figure 3A:
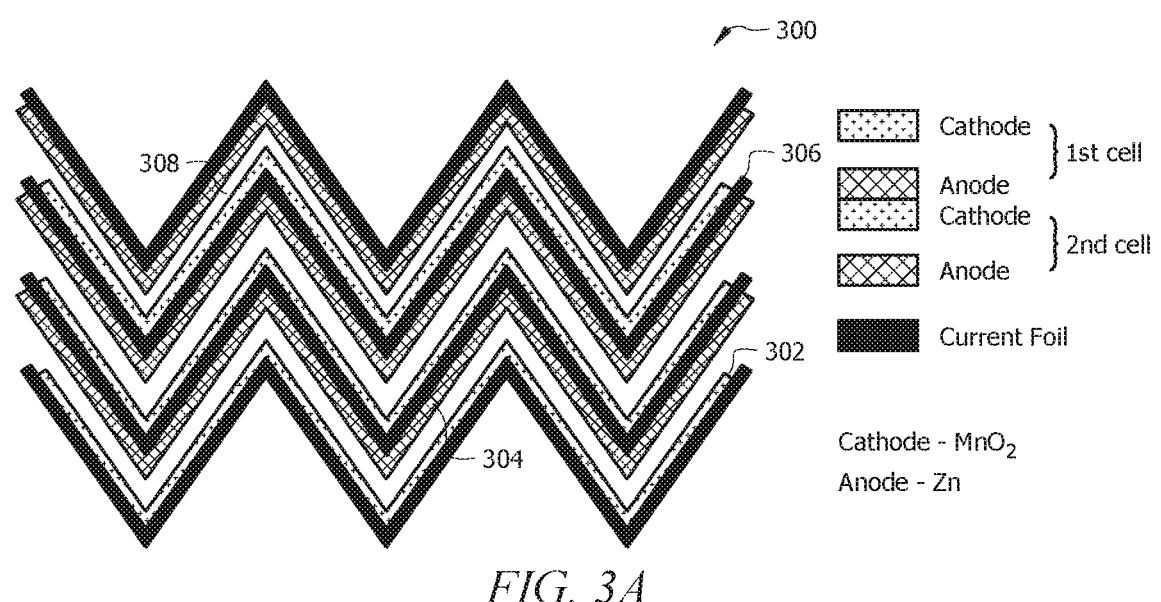
FIGS. 3A and 3B present side views of a zigzag bipolar battery. The cathodes, anodes and the bipolar electrodes are bent into a zigzag manner to create a more compact bipolar design. This design would allow better utilization of material and compression of more cells in a small volume. A 3 cell bipolar battery is shown in the figure as an example.
Figure 3B:
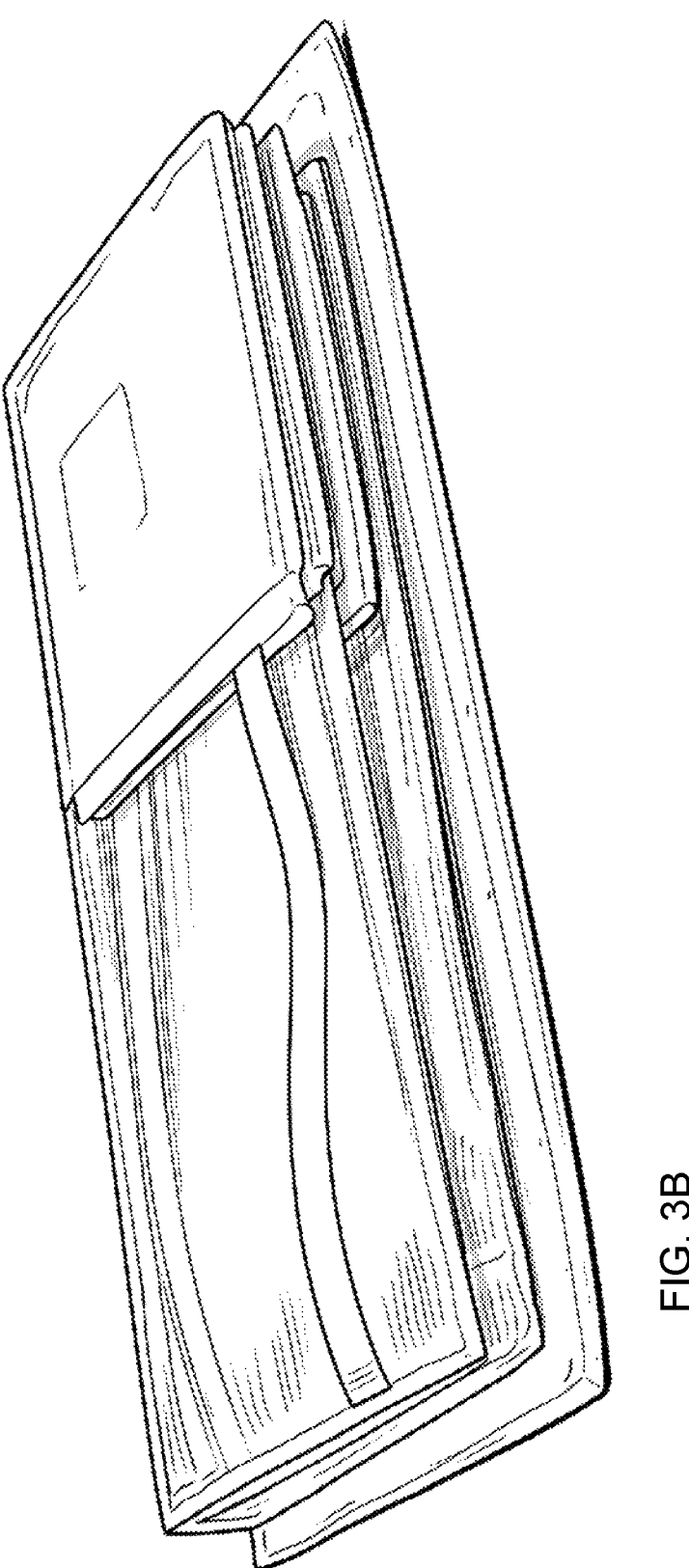

FIG. 2A presents the top view of a cylindrical bipolar battery 200. The cathodes 202, anodes 204, and the bipolar electrodes having a central current collector 208 can be spirally coiled and fitted inside the cylindrical housing. The cathodes 202, anodes 204, separator and electrolyte 206, and the current collectors 208 can all be the same or similar to the corresponding components described with respect to FIGS. 1A-1D. The electrolyte can be disposed with a separator 206 and filled inside the cylindrical housing with care so that there is no contact of electrode between each cell. A 5 cell cylindrical bipolar battery is shown in the example figure showing the capability of achieving >7V of operating voltage. While shown in FIG. 2A as concentric circular layers, a rolled configuration may be similar with the exception that the electrodes may be in a spiral configuration.

In some embodiments, the bipolar battery can be constructed without the use of the frames. Rather, individual cells can be constructed and electrically connected in series to produce the bipolar battery. In this embodiment, individual cells can be constructed with an anode and a cathode having a separator disposed there between. The anode and cathode can each have an individual current collector, including any of the current collectors described with respect to the individual cathodes or individual anodes (e.g., porous current collectors, non-porous current collectors or the like). The anode and cathode can be individually wrapped in a separator material or a separator layer can be disposed between the anode and the cathode. Each individual cell can be sealed using a non-porous material such as a polymeric container. In some embodiments, the sealing material can comprise a material similar to a separator material and/or the material forming the frames, only be prepared to be non-porous. For example, a polypropylene material (e.g., a high density polypropylene material, etc.) can be used to seal the cell. The sealed cell can comprise an electrolyte disposed therein.

A plurality of the sealed cells can be layered and electrically coupled in series to form the bipolar battery. For example, current collector tabs can be coupled to individual anodes and cathodes in an individual cell. The current collector tabs can extend through the seal in the cell without compromising the seal itself. For example, a current collector tab or other current conductor can pass through the seal to provide electrical communication with the anode and cathode in the cell. The cells can be coupled in series by connecting a current collector tab from a cathode in one cell to the current collector tab of an anode in another cell. Two or more cells can then be coupled in series using this configuration. In this configuration, the individual electrodes may not share a common current collector. This configuration is shown in the picture of the cell in FIG. 2B.

The use of individual cells that do not share common current collectors can be formed into different geometries. The cylindrical bipolar cell shown in FIG. 2 can be formed from such as configuration. In this embodiment, a plurality of individually sealed cells can be layered and electrically coupled in series. The layered cells can then be rolled into a spiral (e.g., in a jelly role configuration) to produce a layered, cylindrical form. The resulting bipolar battery can comprise any number of cells needed to provide a desired voltage. While shown in FIG. 2 as concentric circles, the rolled configuration may be similar with the exception that the electrodes may be in a spiral configuration.

FIG. 3 presents the side view of a zigzag bipolar battery 300. The cathodes 302, anodes 304, and the bipolar electrodes having the central current collector 306 can be bent into a zigzag manner to create a more compact bipolar design. The separator 308 can be saturated with electrolyte and disposed between the cathode 302 and the anode 304 in each cell. The cathodes 302, anodes 304, separator and electrolyte 306, and the current collectors 308 can all be the same or similar to the corresponding components described with respect to FIGS. 1A-1D. This design would allow better utilization of material and compression of more cells in a small volume. A 3 cell bipolar battery is shown in FIG. 3 as an example.

In some embodiments, a folded arrangement can be formed using individual cells connected in series. In this embodiment, current collector tabs can be coupled to individual anodes 304 and cathodes 302 in an individual cell. The cells can then be sealed inside of a non-porous material. The current collector tabs can extend through the seal in the cell without compromising the seal itself. For example, a current collector tab or other current conductor can pass through the seal to provide electrical communication with the anode and cathode in the cell. The cells can be coupled in series by connecting a current collector tab from a cathode in one cell to the current collector tab of an anode in another cell. Two or more cells can then be coupled in series using this configuration. In this configuration, the individual electrodes may not share a common current collector. This configuration is shown in the picture of the cell in FIG. 3B.

The use of individual cells that do not share common current collectors can be formed into the geometry shown in FIG. 3. In this embodiment, a plurality of individually sealed cells can be layered and electrically coupled in series. The layered cells can then be folded into a zig-zag shape to produce a layered, cylindrical form. The resulting bipolar battery can comprise any number of cells needed to provide a desired voltage. The layers can then be compressed in a housing to maintain the shape and connection between cells.

The electrodes can then be used to form a bipolar battery. In an embodiment, the bipolar battery with at least two cells arranged in series, can be formed by disposing a cathode into a housing, disposing a bipolar electrode into the housing, disposing an anode into the housing, disposing a polymeric separator between the anode, disposing polymer frames that separate the anode and cathode side of the bipolar electrode from the anode side of the bipolar and cathode to create 2 cells and prevent any electrolyte contact between the cells, and adding an alkaline electrolyte to the housing. The cathode can comprise a first cathode material comprising: a manganese oxide compound selected from the group consisting of birnessite-phase manganese dioxide ($\delta$-MnO$_2$) and electrolytic manganese dioxide (EMD), a bismuth compound selected from the group consisting of elemental bismuth and a bismuth salt, a conductive carbon, and a copper compound such as elemental copper and/or a copper salt. The bipolar electrode can include a second_cathode material and a second anode material pressed on opposite sides. The bipolar cathode can include a manganese oxide compound selected from the group consisting of birnessite-phase manganese dioxide ($\delta$-MnO$_2$) and electrolytic manganese dioxide (EMD), a bismuth compound selected from the group consisting of elemental bismuth and a bismuth salt, a conductive carbon, and a copper compound selected from the group consisting of elemental copper and a copper salt. The bipolar anode can comprise a zinc compound with trace elements of bismuth and indium, a zinc oxide compound, and a binder. The anode can include a first anode material comprising a zinc compound with trace elements of bismuth and indium, a zinc oxide compound, and a binder. The separator and the polymer fames can be disposed so that the anode portion of the bipolar electrode and the cathode are separator and so that the cathode portion of the bipolar electrode and the anode are separated. In some embodiments, the separator(s) and the frames can form a seal so that the electrolyte in each cell is isolated from the electrolyte in the other cells. The individual cells that make up the bipolar battery can be separated from each other by polymer frames. The frame can be affixed with a metal or rubber gasket to prevent any leakage of electrolyte between the individual cells arranged in series. The frames can be rigid structures or flexible to separate the cells and fit the form of the bipolar design.

A bipolar battery with at least two cells arranged in series cycled at limited depth of discharge of a second electron capacity can also be formed. The bipolar battery can be formed by disposing a cathode into a housing, disposing a bipolar electrode into the housing, disposing an anode into the housing, disposing a polymeric separator between the anode, the bipolar electrode and the cathode such that the anode, the bipolar and the cathode are separated, disposing polymer frames that separate the anode and the second cathode material of the bipolar electrode from the second anode material of the bipolar and the cathode to create two cells and prevent electrolyte contact between the two cells, and adding an alkaline electrolyte to the housing. The cathode can comprise a first cathode material comprising: electrolytic manganese dioxide (EMD), and a conductive carbon. The bipolar electrode can comprise a second cathode material and a second anode material pressed on opposite sides, where the second cathode material can comprise electrolytic manganese dioxide (EMD), and a conductive carbon, and the second anode material can comprise a zinc compound with trace elements of bismuth and indium, a zinc oxide compound, and a binder. The anode can comprise a first anode material that can include a zinc compound with trace elements of bismuth and indium, a zinc oxide compound, and a binder.

The batteries described herein can be operated by discharging and charging the cells a plurality of times. The cells can be operated in a variety of modes such as a capacity limited charge and discharge protocol, voltage controlled charge and discharge protocols, and the like at a variety of C rates and different DOD percentages. As used herein, a C-rate is a measure of the rate at which a battery is discharged relative to its maximum capacity. A 1 C rate means that the discharge current will discharge the entire battery in 1 hour, whereas a C/2 rate would discharge the entire battery in 2 hours. In some embodiments, the discharge cycles can access a portion of the second electron capacity of the MnO$_2$. The cells as described herein can maintain a ratio of an initial capacity to an operating capacity of at least about 80%, at least about 90%, or at least about 95% over at least 100 cycles, at least 150 cycles, at least 200 cycles, or at least about 250 cycles. As used herein, each cycle comprises a charge and discharge of the cell, and the initial capacity can be the peak capacity measured after the first or second cycle.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

In example 1, a 2 cell prismatic bipolar battery was constructed. The end of charge of the cell was set to 3.32V. The cathodes consisted of 65% electrolytic manganese dioxide (EMD or MnO$_2$) electroplated with 9 wt. % nickel (Ni), 21% KS-44 graphite and 5% TEFLON. The total cathode weight was 1.27 g of which 0.83 g was of EMD. The capacity based on the $2^{nd}$ electron capacity (617 mAh/g) is ~0.51 Ah. The anodes consisted of 85% zinc, 10% zinc oxide and 5% TEFLON. The total anode weight was 2.57 g which equated to a capacity of 1.79 Ah for the zinc anode (zinc's capacity is 820 mAh/g). The electrodes were rolled into sheets and pressed onto a Ni foil current collector. Three layers of cellophane were wrapped around the MnO$_2$ cathode, and Celgard 5550 and Freudenberg membrane was use to wrap the zinc electrodes. The Ni foil was 1.375 in×1.375 in in dimensions. 25% KOH was used as the electrolyte. A constant current on charge and discharge and constant potential on charge protocol was used.

The initial results of the 2 cell prismatic bipolar battery is presented in FIG. 4. FIG. 4a shows around 100 hours of the bipolar battery cycling reversibly at 1 C. The battery was cycled at 5% depth of discharge (DOD) of the MnO$_2$ capacity. FIG. 4b shows the specific charge and discharge capacity of the battery and FIG. 4d shows the corresponding coulombic and energy efficiency of the battery. The battery ran without any fade in capacity with near 100% coulombic efficiency and >80% energy efficiency. FIG. 4c shows the energy density (Wh/kg of MnO$_2$) of the prismatic bipolar battery. An energy density of ~45 Wh/kg is obtained at 5% DOD of the MnO$_2$ capacity illustrating that higher energy densities are capable if the DOD is increased. Higher energy densities are also possible by increasing the utilization of Zn in the cell. However, increasing the utilization of Zn beyond 15% has been known to adversely affect MnO$_2$ performance, and thus causing battery failure.

Example 2

In example 2, a 2 cell cylindrical bipolar battery was constructed. The end of charge of the cell was set to 3.32V. The cathodes consisted of 65% electrolytic manganese dioxide (EMD or MnO$_2$), 30% KS-44 graphite and 5% TEFLON. The total cathode weight was 7 g of which 4.55 g was of EMD. The capacity based on the $2^{nd}$ electron capacity (617 mAh/g) was ~2.81 Ah. The anodes consisted of 85% zinc, 10% zinc oxide and 5% TEFLON. The total anode weight was 8 g which equated to a capacity of 5.58 Ah for the zinc anode (zinc's capacity is 820 mAh/g). The electrodes were rolled into sheets and pressed onto a Ni foil current collector. The cathode and anode thicknesses were about 0.026 in and 0.022 in, respectively. Two layers of Celgard 5550 were wrapped around the $MnO_2$ cathode and a Freudenberg membrane was used to wrap the zinc electrodes. The Ni foil was 1.375 in×6 in dimensions. The electrodes were spiraled into a cylindrical shape and fitted inside the cylindrical can. 45% KOH was used as the electrolyte. A constant current on charge and discharge and constant potential on charge protocol was used.

Figure 4A:
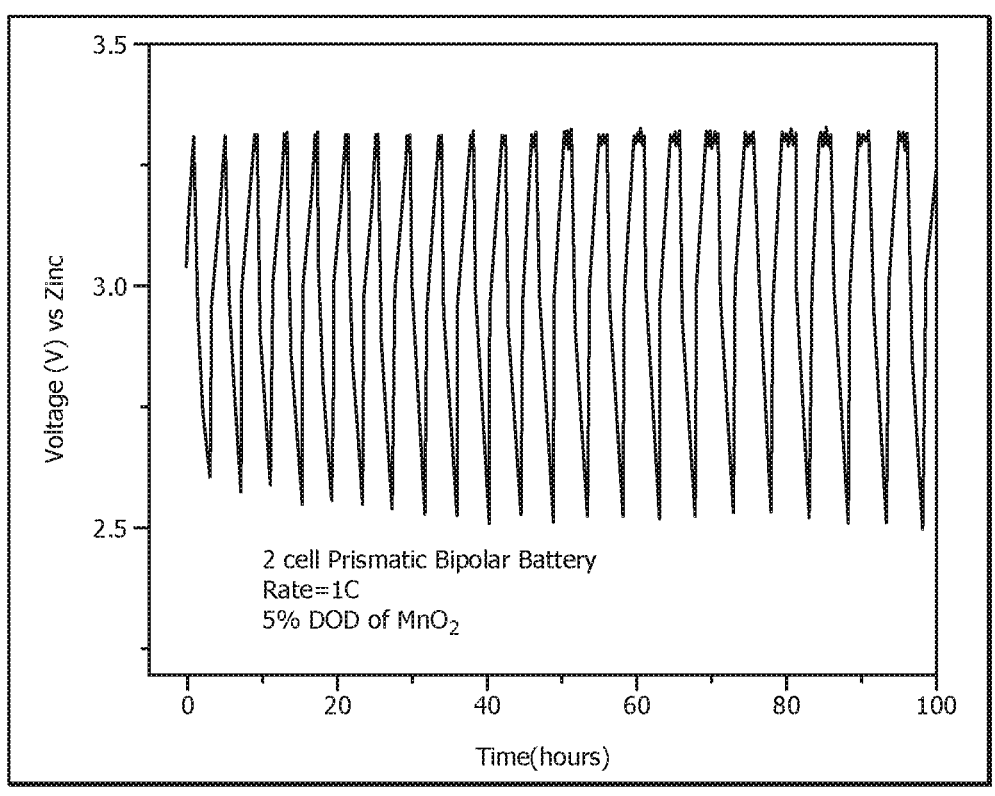
FIG. 4 shows the results for a 2 cell prismatic bipolar battery. The results are for a cathode with 65 wt. % loading of EMD or $MnO_2$. The cell is cycled at 1 C and 5% DOD of the $MnO_2$ $2^{nd}$ electron capacity. (a) Potential-time curves for a 2 cell prismatic bipolar battery is shown. (b) Capacity vs cycle number for a 2 cell prismatic bipolar battery is shown. (c) Energy density (Wh/kg of $MnO_2$) vs cycle number for the 2 cell prismatic bipolar battery is shown. Only the weight of the $MnO_2$ active material is taken into account for the energy density calculations to illustrate the energy densities that are capable of $MnO_2$. (d) Coulombic and Energy efficiency vs cycle number for the 2 cell prismatic bipolar battery is shown.
Figure 4B:
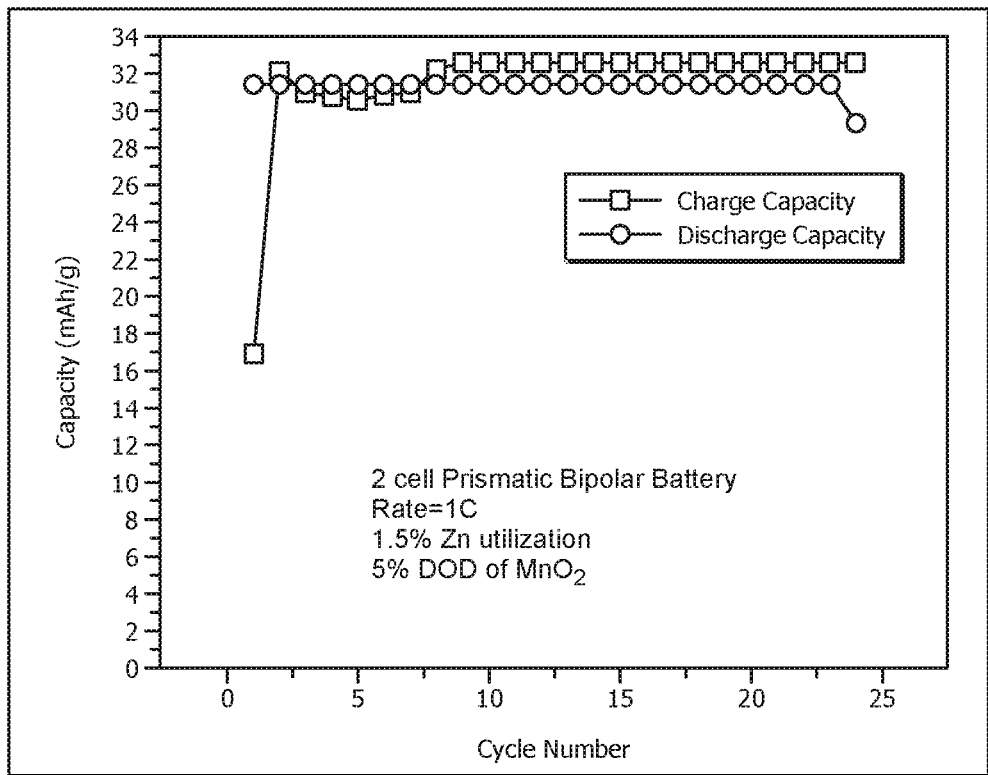
Figure 4C:
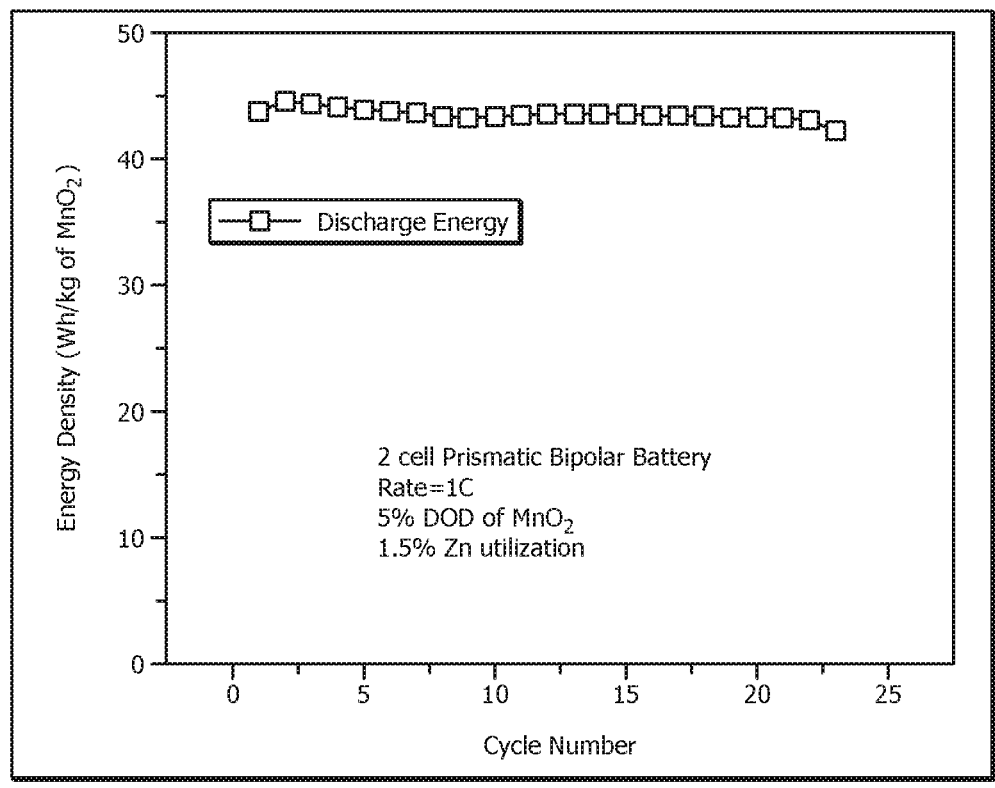
Figure 4D:
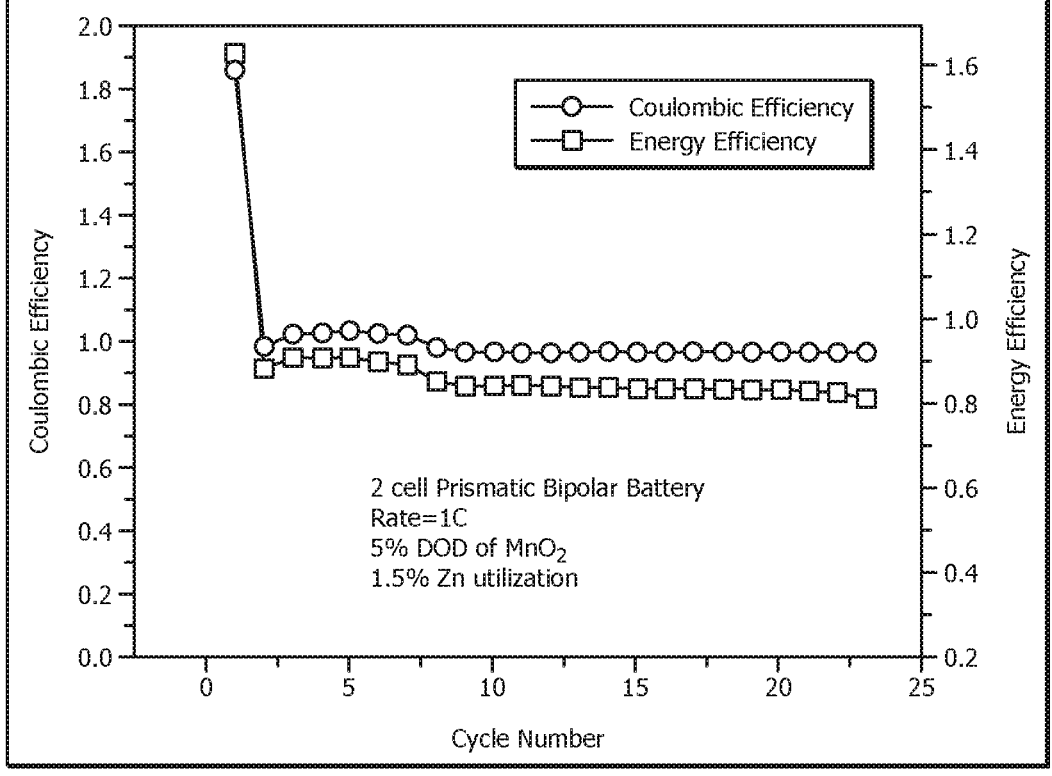
Figure 5A:
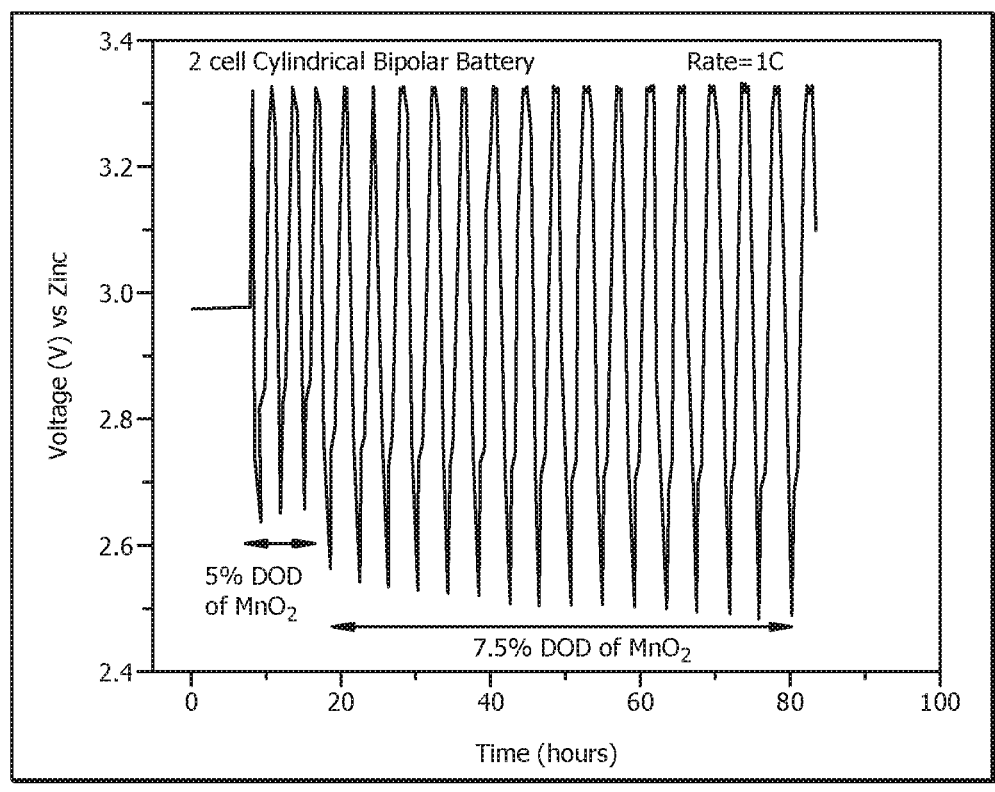
FIG. 5 shows the results for a 2 cell cylindrical bipolar battery. The results are for a cathode with 65 wt. % loading of EMD or $MnO_2$. The cell is cycled at 1 C and 5 and 7.5% DOD of the $MnO_2$ $2^{nd}$ electron capacity. (a) Potential-time curves for a 2 cell cylindrical bipolar battery is shown. (b) Capacity vs cycle number for a 2 cell cylindrical bipolar battery is shown. (c) Energy density (Wh/kg of $MnO_2$) vs cycle number for the 2 cell cylindrical bipolar battery is shown. Only the weight of the $MnO_2$ active material is taken into account for the energy density calculations to illustrate the energy densities that are capable of $MnO_2$. (d) Coulombic and Energy efficiency vs cycle number for the 2 cell cylindrical battery is shown.
Figure 5B:
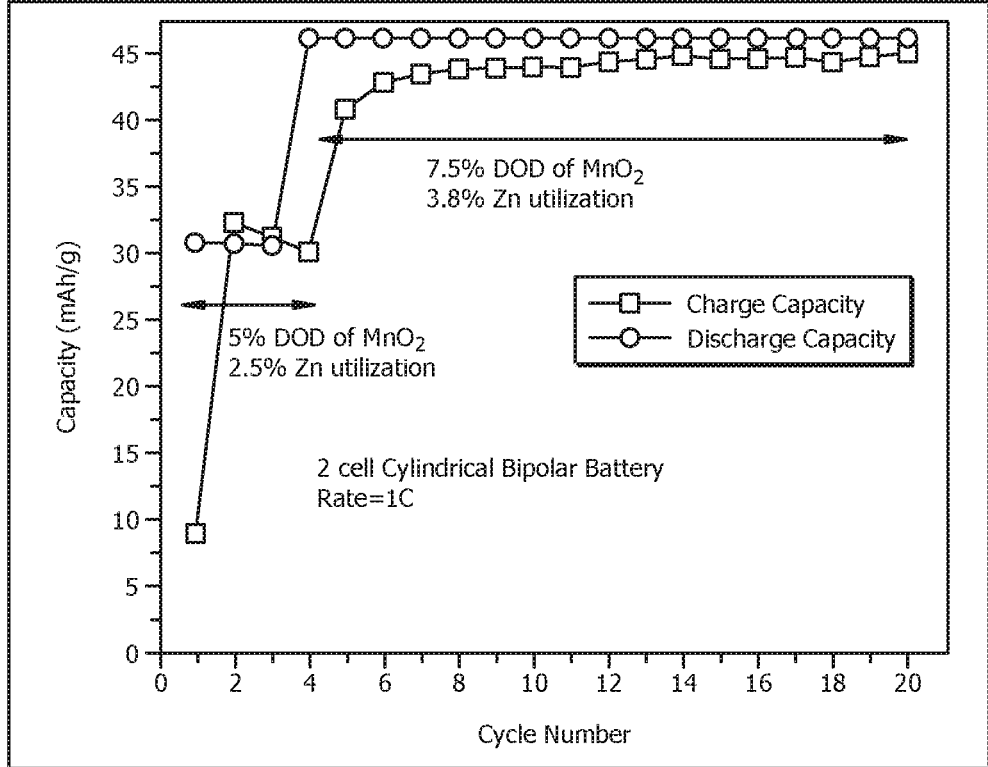
Figure 5C:
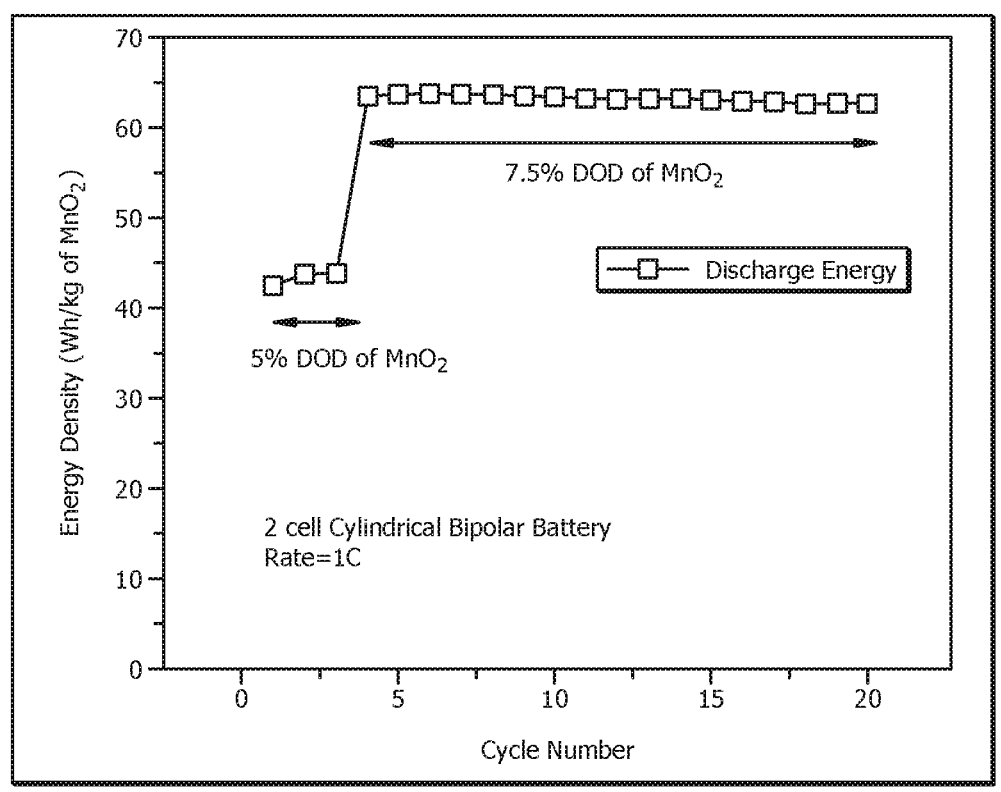
Figure 5D:
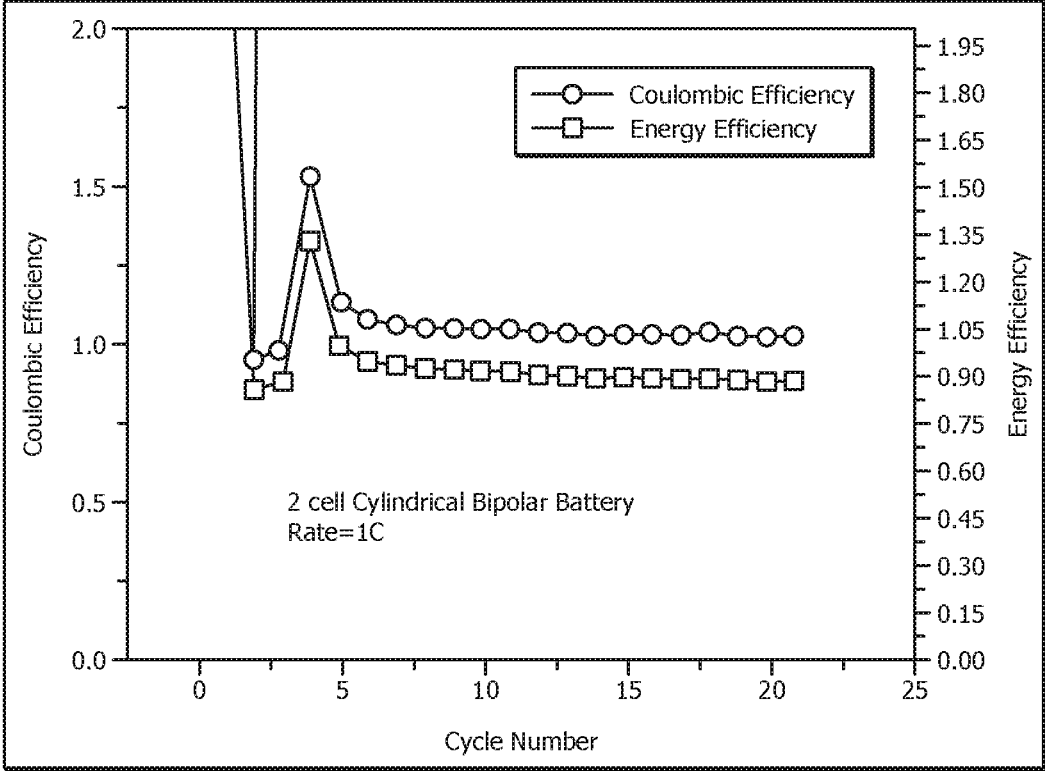
Figure 6A:
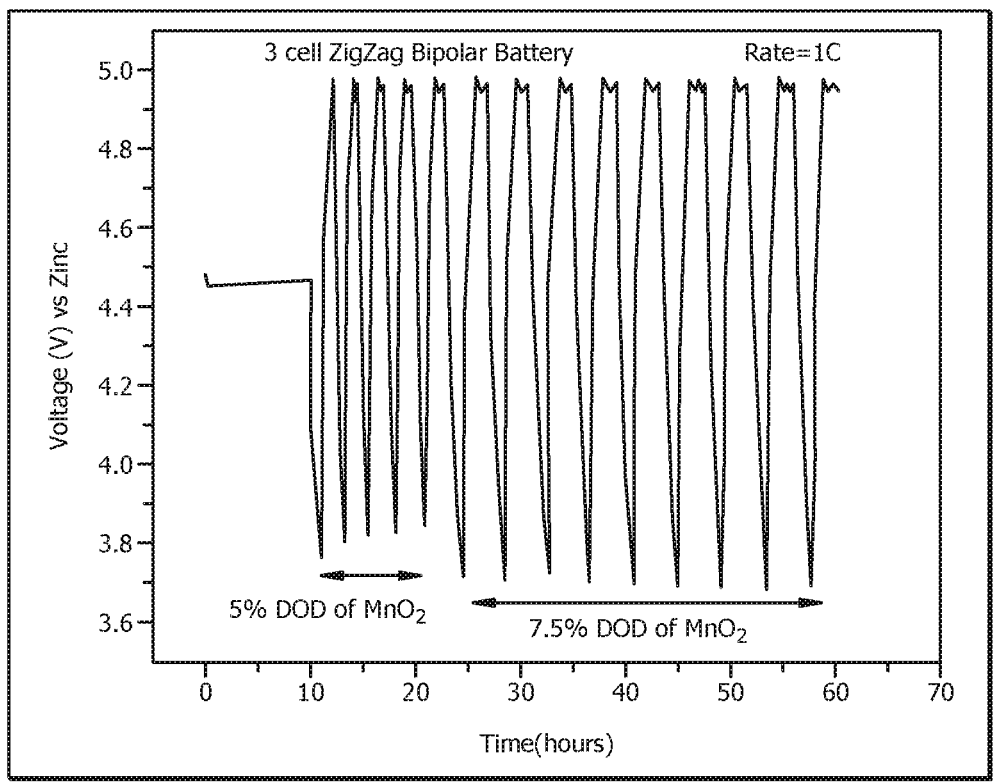
FIG. 6 shows the results for a 3 cell zigzag bipolar battery. The results are for a cathode with 65 wt. % loading of EMD or $MnO_2$. The cell is cycled at 1 C and 5 and 7.5% DOD of the $MnO_2$ $2^{nd}$ electron capacity. (a) Potential-time curves for a 3 cell zigzag bipolar battery is shown. The voltages seen are comparable to lithium-ion batteries (b) Capacity vs cycle number for a 3 cell zigzag bipolar battery is shown. (c) Energy density (Wh/kg of $MnO_2$) vs cycle number for the 3 cell zigzag bipolar battery is shown. Only the weight of the $MnO_2$ active material is taken into account for the energy density calculations to illustrate the energy densities that are capable of $MnO_2$. (d) Coulombic and Energy efficiency vs cycle number for the 3 cell zigzag battery is shown.
Figure 6B:
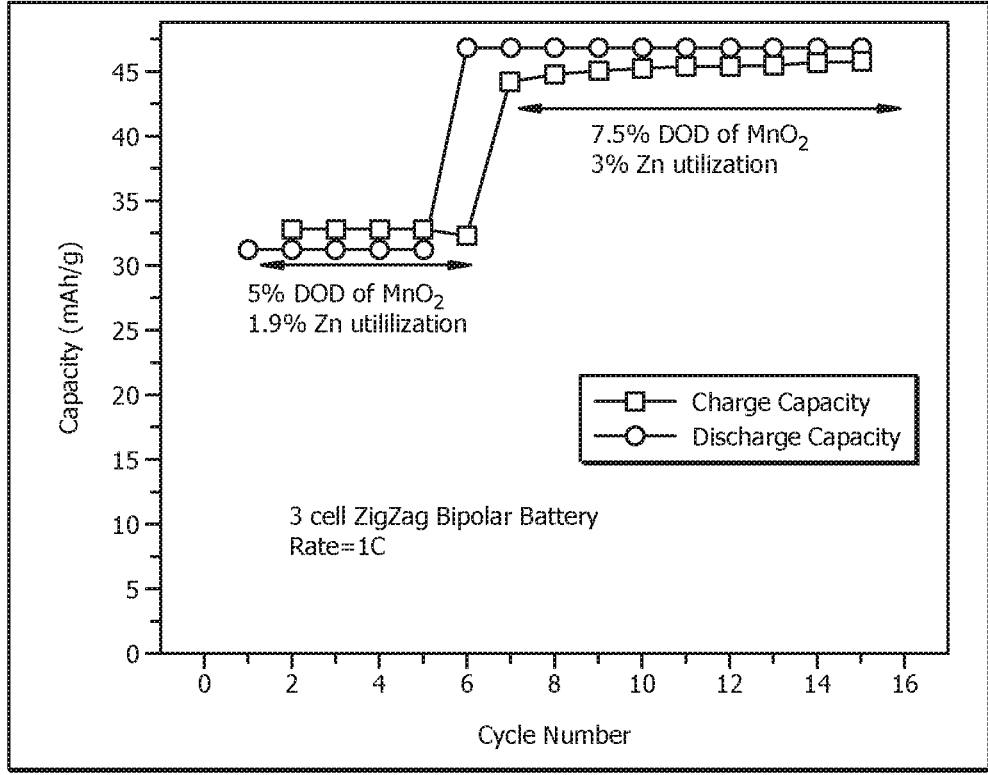
Figure 6C:
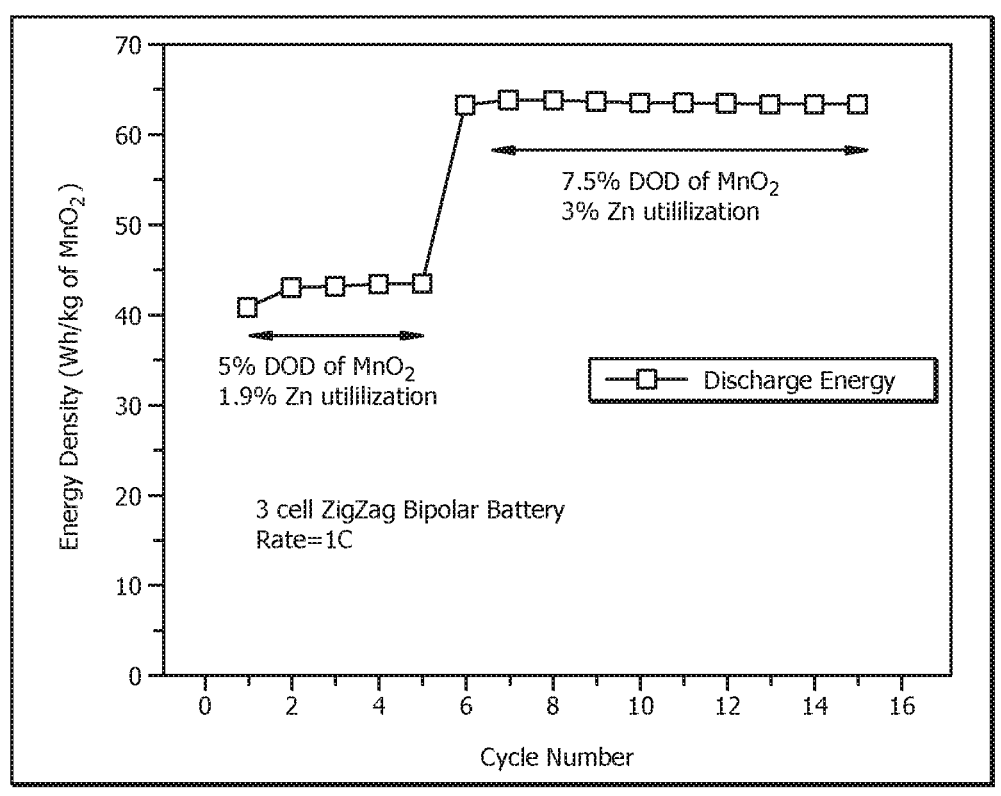
Figure 6D:
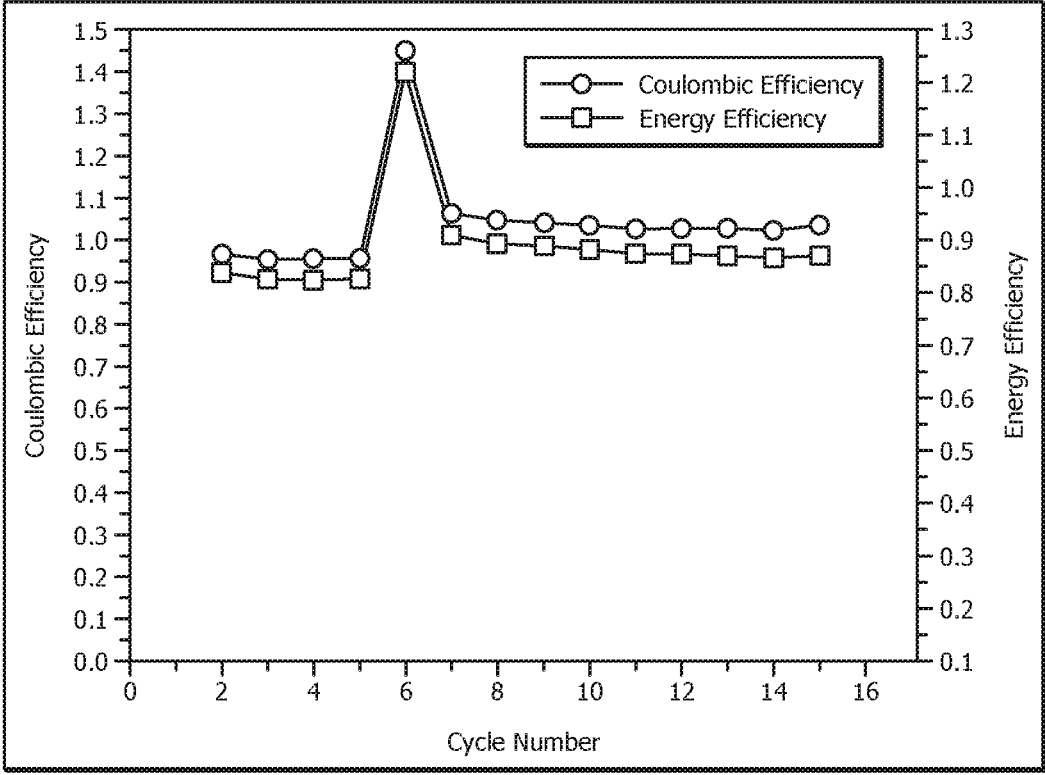

The initial results of the 2 cell cylindrical bipolar battery is presented in FIG. 5. FIG. 5a shows around 80 hours of the bipolar battery cycling reversibly at 1 C. The battery was cycled at 5% depth of discharge (DOD) of the $MnO_2$ capacity for the first 4 cycles after which the DOD was increased to 7.5%. FIG. 5b shows the specific charge and discharge capacity of the battery and FIG. 5d shows the corresponding coulombic and energy efficiency of the battery. The battery is running without any fade in capacity with near 100% coulombic efficiency and around 90% energy efficiency which is quite remarkable for a cylindrical bipolar battery. FIG. 4c shows the energy density (Wh/kg of $MnO_2$) of the cylindrical bipolar battery. An energy density of ~45 Wh/kg was obtained at 5% DOD of the $MnO_2$ capacity for the first 4 cycles and 65 Wh/kg for the remaining cycles with 7.5% DOD. This illustrates that higher energy densities are capable if the DOD is increased. Higher energy densities are also possible by increasing the utilization of Zn in the cell. However, increasing the utilization of Zn beyond 15% has been known to adversely affect $MnO_2$ performance, and thus causing battery failure.

Example 3

In example 3, a 3 cell zigzag bipolar battery was constructed. The end of charge of the cell was set to 4.98V. The cathodes consisted of 65% electrolytic manganese dioxide (EMD or $MnO_2$), 30% KS-44 graphite and 5% TEFLON. The total cathode weight was 13 g of which 8.4 5 g was of EMD. The capacity based on the $2^{nd}$ electron capacity (617 mAh/g) is ~5.21 Ah. The anodes consisted of 85% zinc, 10% zinc oxide, and 5% TEFLON. The total anode weight was 20 g which equated to a capacity of 13.94 Ah for the zinc anode (zinc's capacity is 820 mAh/g). The electrodes were rolled into sheets and pressed onto a Ni foil current collector. The cathode and anode thicknesses were about 0.026 in and 0.022 in. Two layers of Celgard 5550 were wrapped around the $MnO_2$ cathode and a Freudenberg membrane was used to wrap the zinc electrodes. The Ni foil was 2 in×7 in in dimensions. The electrodes were folded in a zigzag pattern like shown in FIG. 3 and kept under compression. 45% KOH was used as the electrolyte. A constant current on charge and discharge and constant potential on charge protocol was used.

The initial results of the 3 cell zigzag bipolar battery is presented in FIG. 6. FIG. 6a shows around 60 hours of the bipolar battery cycling reversibly at 1 C. The battery was cycled at 5% depth of discharge (DOD) of the $MnO_2$ capacity for the first 6 cycles after which the DOD was increased to 7.5%. FIG. 6b shows the specific charge and discharge capacity of the battery and FIG. 6d shows the corresponding coulombic and energy efficiency of the battery. The battery was running without any fade in capacity with near 100% coulombic efficiency and around 90% energy efficiency which is quite remarkable again for a zigzag bipolar battery. FIG. 6c shows the energy density (Wh/kg of $MnO_2$) of the zigzag bipolar battery. An energy density of ~45 Wh/kg was obtained at 5% DOD of the $MnO_2$ capacity for the first 6 cycles and ~65 Wh/kg for the remaining cycles with 7.5% DOD. This illustrates that higher energy densities are capable if the DOD is increased. Higher energy densities are also possible by increasing the utilization of Zn in the cell. However, increasing the utilization of Zn beyond 15% has been known to adversely affect $MnO_2$ performance, and thus causing battery failure.

Example 4

In example 4, a $2^{nd}$ electron prismatic bipolar battery consisting of 2 cells was constructed. The end of charge of the cell was set to 3.33V. The cathodes consisted of 38.4 wt. % electrolytic manganese dioxide (EMD or $MnO_2$), 7.68 wt. % bismuth oxide ($Bi_2O_3$), 36.7% carbon nanotubes (CNT), 2.56% TEFLON and the remaining elemental copper. The total cathode weight was 3.093 g of which 1.188 g was of EMD. The capacity based on the $2^{nd}$ electron capacity (617 mAh/g) was ~0.733 Ah. The anodes consisted of 85% zinc, 10% zinc oxide and 5% TEFLON. The total anode weight was 5.3 g which equated to a capacity of 3.69 Ah for the zinc anode (zinc's capacity is 820 mAh/g). The electrodes were rolled into sheets and pressed onto a Ni foil current collector. The cathode and anode thicknesses were about 0.034 in and 0.022 in. Two layers of Celgard 5550 were wrapped around the $MnO_2$ cathode and a Freudenberg membrane was used to wrap the zinc electrodes. The Ni foil was 1.375 in×1.375 in in dimensions. Three layers of cellophane were wrapped around the $MnO_2$ cathode, and Celgard 5550 and Freudenberg membrane was use to wrap the zinc electrodes. 25% KOH was used as the electrolyte. A constant current on charge and discharge and constant potential on charge protocol was used.

Figure 7A:
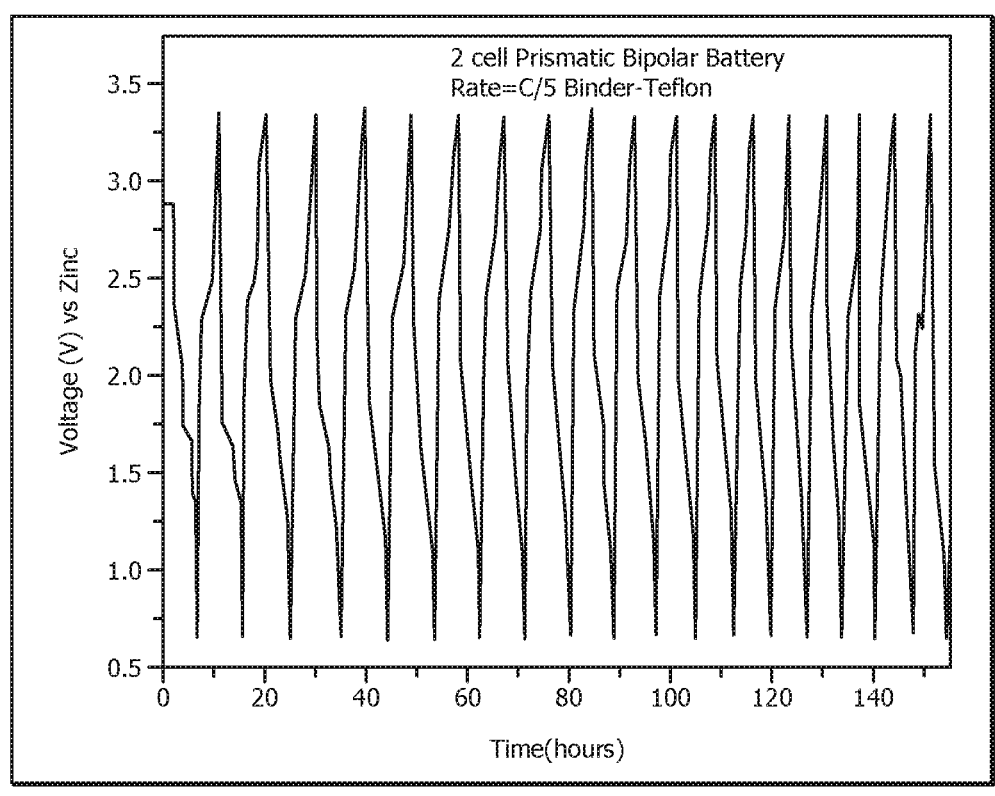
FIG. 7 shows the results for a 2 cell $2^{nd}$ electron prismatic bipolar battery. The results are for a cathode with 45 wt. % loading of EMD or $MnO_2$. The cell is cycled at C/5 and 100% DOD of the $MnO_2$ $2^{nd}$ electron capacity. TEFLON was used as a binder in the $MnO_2$ electrodes for ease of manufacturability. (a) Potential-time curves for a 2 cell $2^{nd}$ electron prismatic bipolar battery is shown. (b) Capacity vs cycle number for a 2 cell $2^{nd}$ electron prismatic bipolar battery is shown. (c) Energy density (Wh/kg of $MnO_2$) vs cycle number for the 2 cell $2^{nd}$ electron prismatic bipolar battery is shown. Only the weight of the $MnO_2$ active material is taken into account for the energy density calculations to illustrate the high energy densities that are capable of $MnO_2$ when the $2^{nd}$ electron capacity is accessed.
Figure 7B:
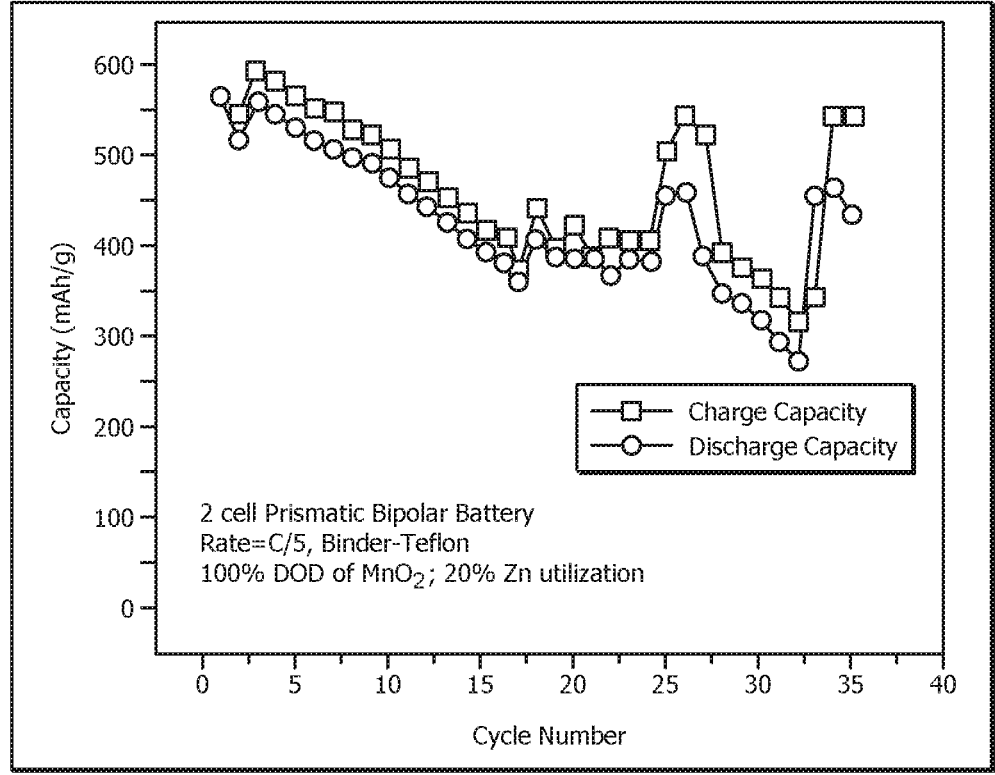
Figure 7C:
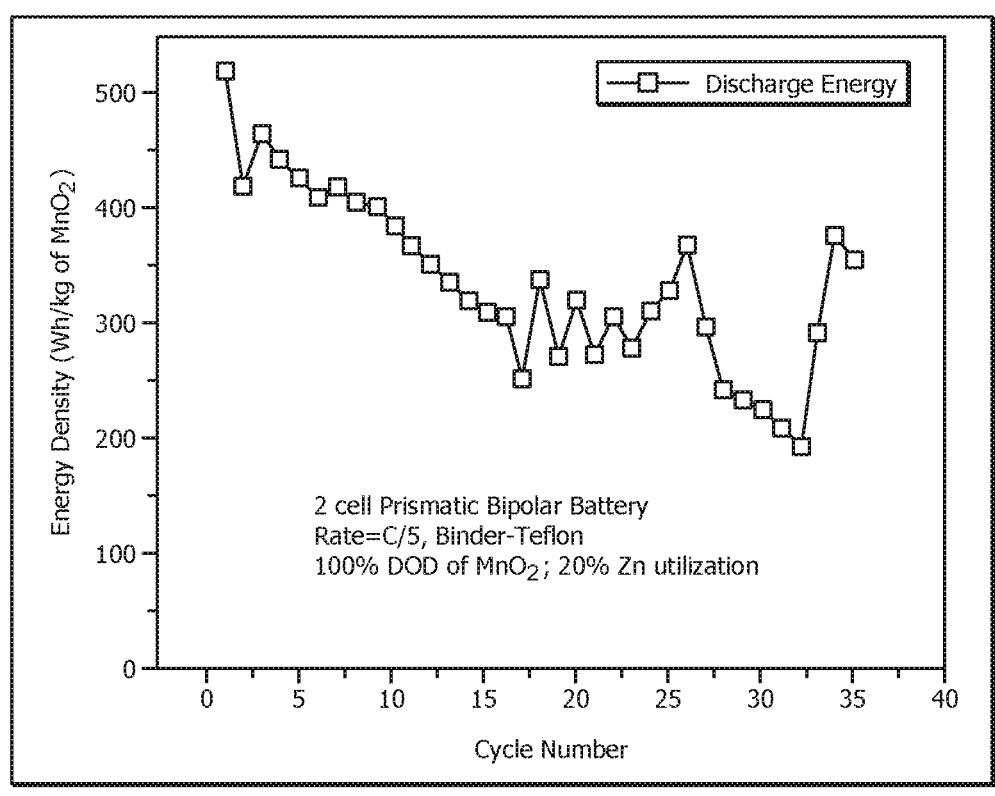

The initial results of the $2^{nd}$ electron prismatic bipolar battery are presented in FIG. 7. FIG. 7a shows around 150 hours of the bipolar battery cycling reversibly at C/5. The battery was cycled at 100% depth of discharge (DOD) of the $MnO_2$ capacity. FIG. 7b shows the specific charge and discharge capacity of the battery. The battery was running with near 100% coulombic efficiency with fade seen in the first 15 cycles after which it becomes stable for 10 cycles. The fade could be attributed to the presence of TEFLON in the electrodes and the high DOD of the Zn electrode (20%). TEFLON is primarily used to ease the manufacturability of the electrodes, however, the electrodes sacrifice on conductivity. At 100% DOD of the $MnO_2$ electrode conductivity is an important factor which is affected by the TEFLON. Also, the 20% Zn DOD causes shape change on the electrode that degrades the Zn electrode as well. A combination of these factors could be attributed to the fade seen in the battery. FIG. 7c shows the energy density (Wh/kg of $MnO_2$) of the $2^{nd}$ electron prismatic bipolar battery. An initial energy density of ~510 Wh/kg was obtained at 100% DOD of the $MnO_2$ showing the highest energy density ever obtained for a $MnO_2$—Zn battery. This battery illustrates the points that the earlier examples were making that increasing the DOD of $MnO_2$ and Zn increase the energy density of the battery significantly. The fade in the energy density is related to the capacity fade where it can be attributed to TEFLON and the high DOD of the Zn electrodes. In spite of the fade the battery shows that after 36 cycles that it can still discharge ~350 Wh/kg of $MnO_2$.

Example 5

In example 5, a $2^{nd}$ electron prismatic bipolar battery consisting of 3 cells was constructed. The end of charge of the cell was set to 4.95V. The cathodes consisted of 40.5 wt. % electrolytic manganese dioxide (EMD or $MnO_2$), 8.1 wt. % bismuth oxide ($Bi_2O_3$), 38.7% carbon nanotubes (CNT), 2.7% TEFLON and the remaining copper. The total cathode weight was 2.933 g of which 1.116 g was of EMD. The capacity based on the $2^{nd}$ electron capacity (617 mAh/g) is ~0.689 Ah. The anodes consisted of 85% zinc, 10% zinc oxide and 5% TEFLON. The total anode weight was 5.3 g which equated to a capacity of 3.69 Ah for the zinc anode (zinc's capacity is 820 mAh/g). The electrodes were rolled into sheets and pressed onto a Ni foil current collector. The cathode and anode thicknesses were about 0.034 in and 0.022 in. The Ni foil was 1.375 in×1.375 in in dimensions. Three layers of cellophane were wrapped around the $MnO_2$ cathode, and Celgard 5550 and Freudenberg membrane was use to wrap the zinc electrodes. 25% KOH was used as the electrolyte. A constant current on charge and discharge and constant potential on charge protocol was used.

Figure 8A:
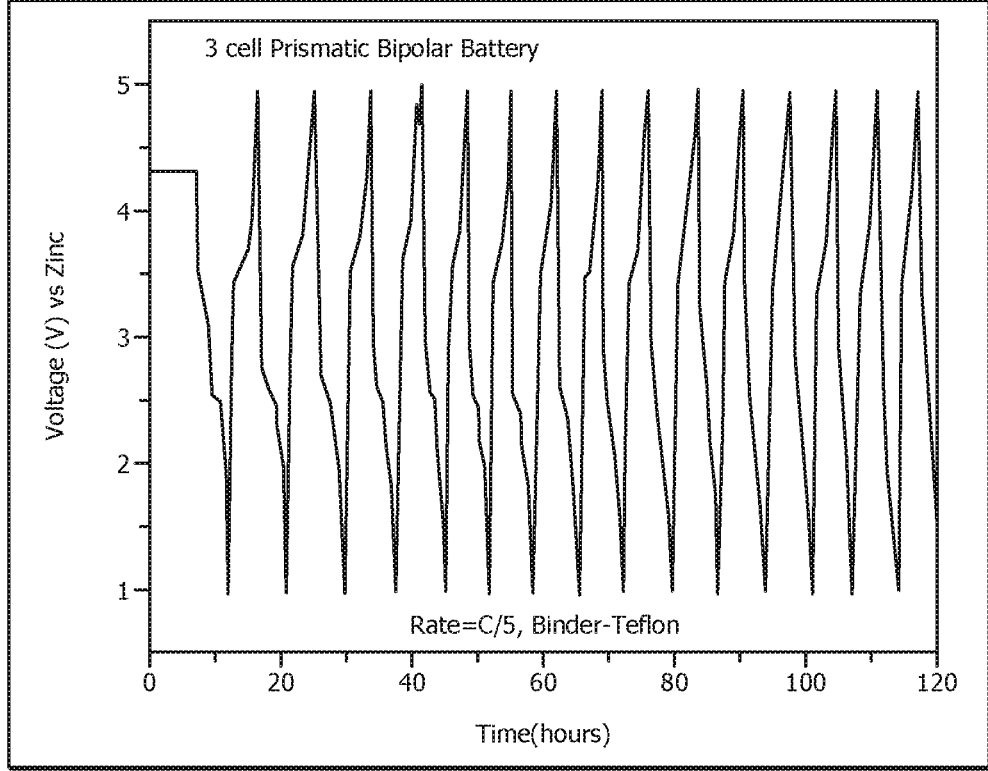
FIG. 8 shows the results for a 3 cell $2^{nd}$ electron prismatic bipolar battery. The results are for a cathode with 45 wt. % loading of EMD or $MnO_2$. The cell is cycled at C/5 and 100% DOD of the $MnO_2$ $2^{nd}$ electron capacity. TEFLON was used as a binder in the $MnO_2$ electrodes for ease of manufacturability. (a) Potential-time curves for a 3 cell $2^{nd}$ electron prismatic bipolar battery is shown. (b) Capacity vs cycle number for a 3 cell $2^{nd}$ electron prismatic bipolar battery is shown. (c) Energy density (Wh/kg of $MnO_2$) vs cycle number for the 3 cell $2^{nd}$ electron prismatic bipolar battery is shown. Only the weight of the $MnO_2$ active material is taken into account for the energy density calculations to illustrate the high energy densities that are capable of $MnO_2$ when the $2^{nd}$ electron capacity is accessed.
Figure 8B:
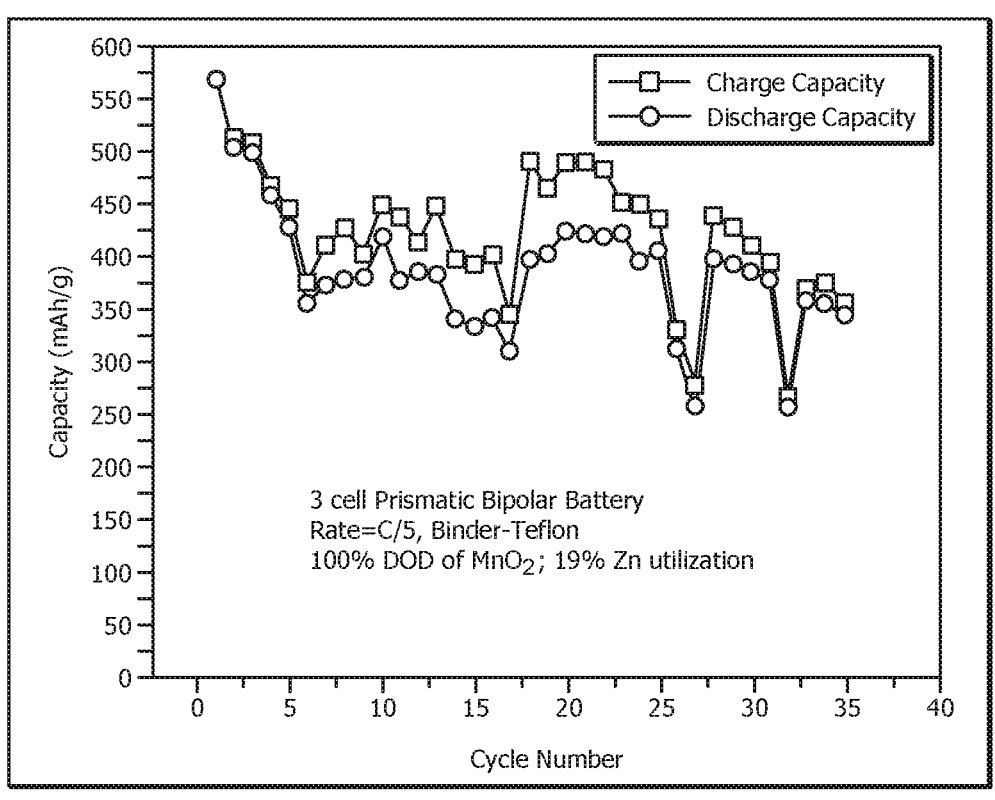
Figure 8C:
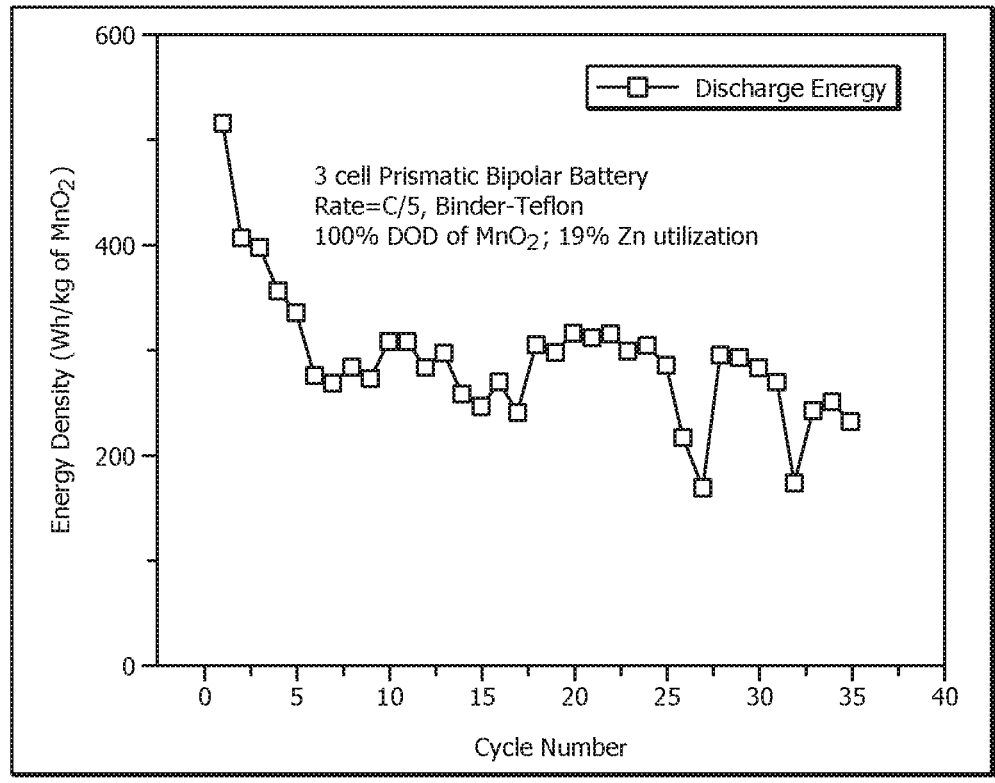

The initial results of the $2^{nd}$ electron prismatic bipolar battery are presented in FIG. 8. FIG. 8a shows around 120 hours of the bipolar battery cycling reversibly at C/5. The battery was cycled at 100% depth of discharge (DOD) of the $MnO_2$ capacity. FIG. 8b shows the specific charge and discharge capacity of the battery. The battery was running with near 100% coulombic efficiency with fade seen in the first 5 cycles after which it becomes stable. The fade, again in this case, could be attributed to the presence of TEFLON in the electrodes and the high DOD of the Zn electrode (19%). A combination of these factors could be attributed to the fade seen in the battery. FIG. 8c shows the energy density (Wh/kg of $MnO_2$) of the $2^{nd}$ electron prismatic bipolar battery. An initial energy density of ~510 Wh/kg of $MnO_2$ is obtained at 100% DOD of the $MnO_2$, similar to the previous example. At the end of 35 cycles, the energy density is ~250 Wh/kg. The drop in energy is due to the fall of voltage at which the energy is obtained. This is again attributed probably to a high resistance created by the use of TEFLON as the binder.

Example 6

In example 6, a $2^{nd}$ electron prismatic bipolar battery consisting of 3 cells was constructed. The end of charge of the cell was set to 4.95V. The cathodes consisted of 40.77 wt. % electrolytic manganese dioxide (EMD or $MnO_2$), 8.15 wt. % bismuth oxide ($Bi_2O_3$), 32.6% carbon nanotubes (CNT) and the remaining elemental copper. The total cathode weight was 2.453 g of which 1 g was of EMD. The capacity based on the $2^{nd}$ electron capacity (617 mAh/g) was 0.617 Ah. The anodes consisted of 85% zinc, 10% zinc oxide and 5% TEFLON. The total anode weight was 5.3 g which equated to a capacity of 3.69 Ah for the zinc anode (zinc's capacity is 820 mAh/g). The electrodes were pasted and pressed onto a Ni foil current collector. The Ni foil was 1.375 in×1.375 in in dimensions. Three layers of cellophane were wrapped around the $MnO_2$ cathode, and Celgard 5550 and Freudenberg membrane was use to wrap the zinc electrodes. 25% KOH was used as the electrolyte. A constant current on charge and discharge and constant potential on charge protocol was used.

Figure 9A:
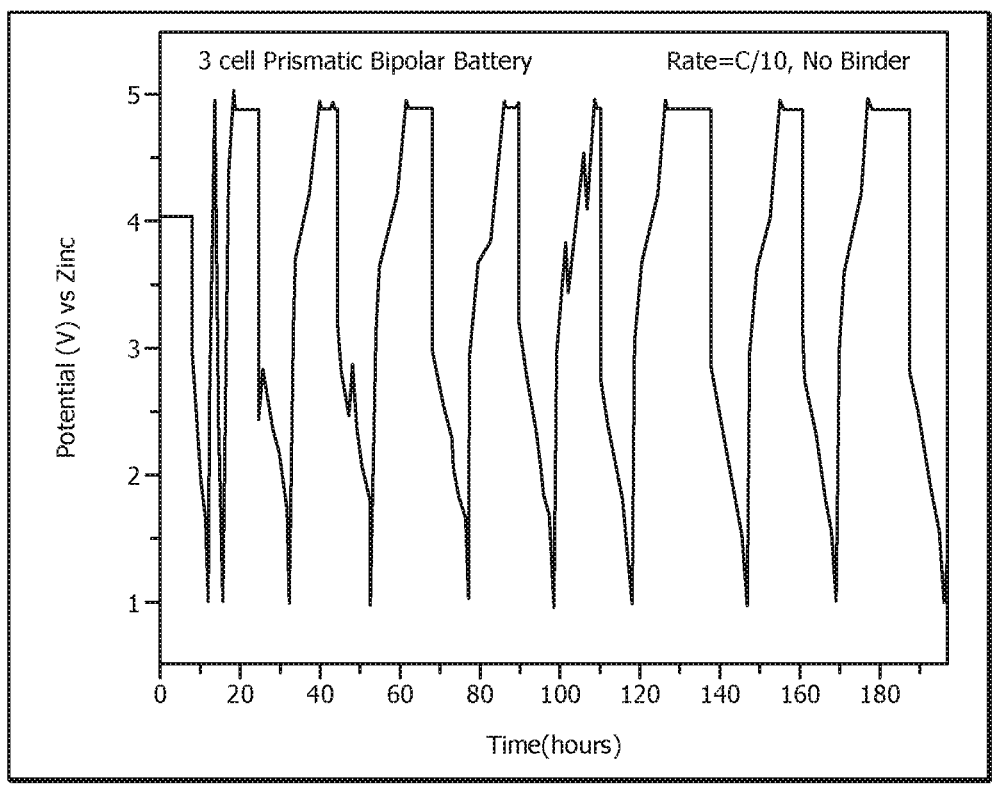
FIG. 9 shows the results for a 3 cell $2^{nd}$ electron prismatic bipolar battery. The results are for a cathode with 50 wt. % loading of EMD or $MnO_2$. The cell is cycled at C/10 and 100% DOD of the $MnO_2$ $2^{nd}$ electron capacity. No binder was used on the $MnO_2$ cathode for this battery. (a) Potential-time curves for a 3 cell $2^{nd}$ electron prismatic bipolar battery is shown. (b) Capacity vs cycle number for a 3 cell $2^{nd}$ electron prismatic bipolar battery is shown. (c) Energy density (Wh/kg of $MnO_2$) vs cycle number for the 3 cell $2^{nd}$ electron prismatic bipolar battery is shown. Only the weight of the $MnO_2$ active material is taken into account for the energy density calculations to illustrate the high energy densities that are capable of $MnO_2$ when the $2^{nd}$ electron capacity is accessed.
Figure 9B:
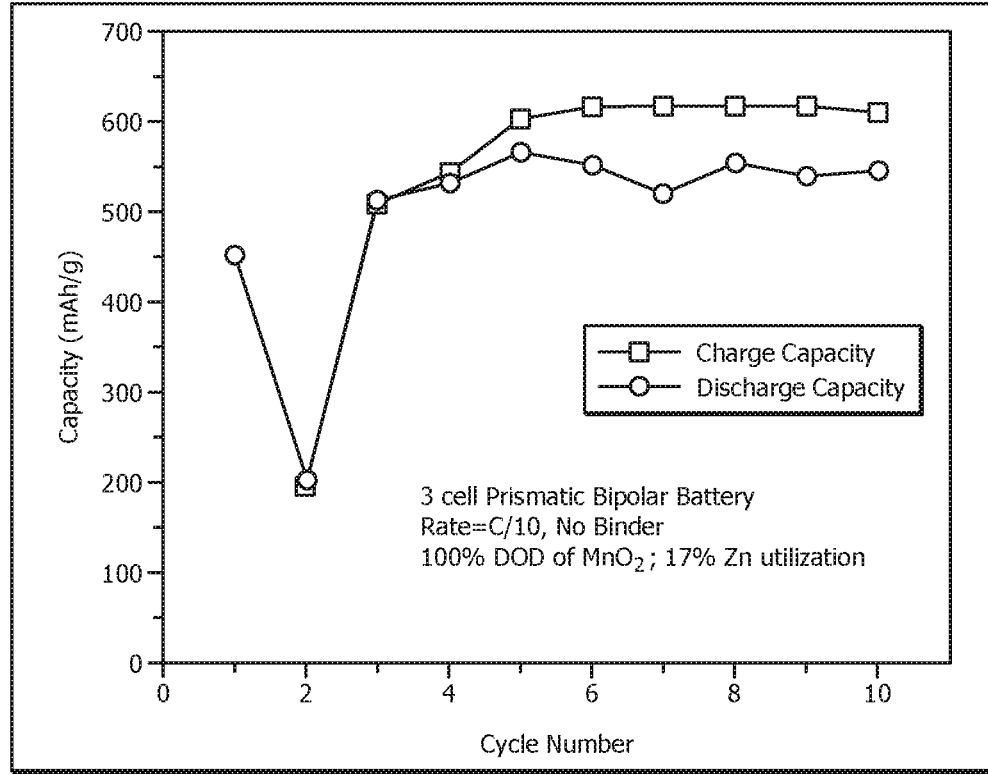
Figure 9C:
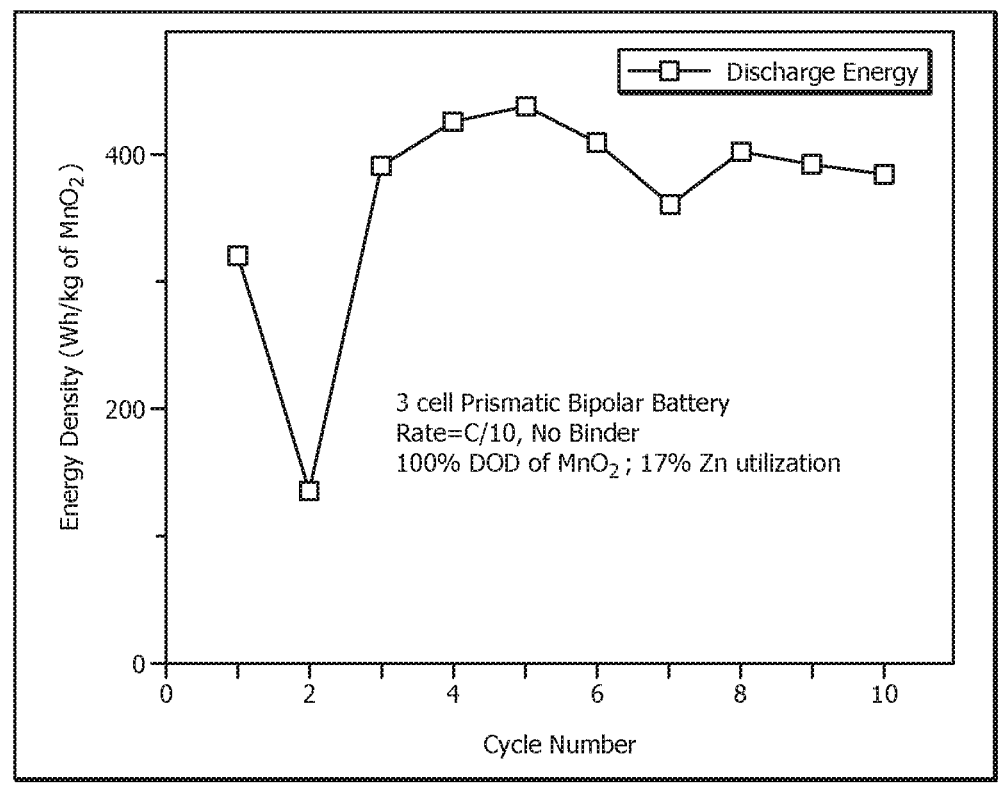

The initial results of the $2^{nd}$ electron prismatic bipolar battery with no binder are presented in FIG. 9. FIG. 9a shows around 200 hours of the bipolar battery cycling reversibly at C/10. The battery was cycled at 100% depth of discharge (DOD) of the $MnO_2$ capacity. FIG. 9b shows the specific charge and discharge capacity of the battery. The battery is running with near 100% coulombic efficiency with no sign of fade seen. The initial drop seen is due to the resistance of the electrode to a high rate (C/5) discharge protocol for the $1^{st}$ cycle after which the rate was changed to C/10. FIG. 9c shows the energy density (Wh/kg of $MnO_2$) of the $2^{nd}$ electron prismatic bipolar battery. A consistent energy density of ~400 Wh/kg of $MnO_2$ is seen, which indicates that in examples 4 and 5 that TEFLON could be the reason for the drops in energy for those batteries.

Having described various systems, methods, batteries, and electrodes herein, various embodiments can include, but are not limited to:

In a first embodiment, a bipolar battery having at least two electrochemical cells electrically arranged in series to access a second electron capacity of manganese dioxide, the bipolar battery comprises: a housing; an electrolyte disposed in the housing; a bipolar electrode disposed in the housing and comprising: a first anode material; and a first cathode material, wherein the first cathode material and the first anode material are disposed on opposite faces of the bipolar electrode; an anode disposed in the housing and comprising a second anode material comprising: a zinc compound with trace elements of bismuth and indium; a zinc oxide compound; and a binder; a cathode disposed in the housing and comprising a second cathode material comprising: a manganese oxide compound selected from the group consisting of birnessite-phase manganese dioxide ($\delta$-$MnO_2$) and electrolytic manganese dioxide (EMD); a bismuth compound selected from the group consisting of elemental bismuth and a bismuth salt; a conductive carbon; and a copper compound selected from the group consisting of elemental copper and a copper salt; the first cathode material of the bipolar electrode facing the second anode material, and the first anode material of the bipolar electrode facing the second cathode material; and a first microporous separator between the first cathode material and the second anode material and a second microporous separator between the first anode material and the second cathode material.

A second embodiment can include the bipolar battery of the first embodiment, wherein the bipolar battery accesses 20-100% of the second electron capacity of manganese dioxide for at least 10 cycles.

A third embodiment can include the bipolar battery of the first or second embodiment, wherein the second cathode material further comprises an electroplated conductive metal additive selected from the group consisting of nickel, copper, silver, aluminum, gold, tin, cobalt, nickel-cobalt, brass, bronze, and combinations thereof.

A fourth embodiment can include the bipolar battery of the third embodiment, wherein the electroplated conductive metal additive is present in the second cathode material at a concentration that is greater than 0 wt. % and less than or equal to 20 wt %.

A fifth embodiment can include the bipolar battery of any of the first to fourth embodiments, wherein the bismuth compound is bismuth oxide and the copper compound is elemental copper.

A sixth embodiment can include the bipolar battery of any of the first to fourth embodiments, wherein the copper compound is a copper oxide.

A seventh embodiment can include the bipolar battery of any of the first to sixth embodiments, wherein the conductive carbon is selected from the group consisting of graphite, carbon black, acetylene black, single walled carbon nanotubes, multi-walled carbon nanotubes, graphene, graphyne, graphene oxide, and combinations thereof.

An eighth embodiment can include the bipolar battery of any of the first to seventh embodiments, wherein the second cathode material consists essentially of greater than 0 wt. % and less than or equal to 50 wt. % of the conductive carbon; between 1-20 wt. % of the bismuth compound; between 1-70 wt. % of the copper compound; greater than or equal to 0 wt. % and less than or equal to 10 0 wt. % of a binder; and the balance being the manganese oxide compound.

A ninth embodiment can include the bipolar battery of any of the first to eighth embodiments, wherein the second anode material consists essentially of greater than 0 and less than or equal to 30% zinc oxide, greater than 0 and less than or equal to 10% binder and the balance being the zinc compound with trace amounts of bismuth and indium.

A tenth embodiment can include the bipolar battery of any of the first to ninth embodiments, wherein the cathode and anode has a porosity between 5-95%.

An eleventh embodiment can include the bipolar battery of any of the first to tenth embodiments, wherein the copper compound comprises a solid copper support.

A twelfth embodiment can include the bipolar battery of any of the first to eleventh embodiments, wherein the bipolar battery is a secondary battery that is galvanostatically rechargeable for at least ten cycles.

A thirteenth embodiment can include the bipolar battery of any of the first to twelfth embodiments, further comprising a polymeric separator between each of the anode, cathode and bipolar electrode.

A fourteenth embodiment can include the bipolar battery of the thirteenth embodiment, wherein the polymeric separator comprises a polymer selected from the group consisting of a cellulose film, a sintered polymer film, a hydrophilically modified polyolefin, or combinations thereof.

A fifteenth embodiment can include the bipolar battery of any of the first to fourteenth embodiments, wherein the second cathode material and the second anode material further comprises a polytetrafluoroethylene binder.

A sixteenth embodiment can include the bipolar battery of any of the first to fourteenth embodiments, wherein the second cathode material and the second anode material further comprises a cellulose-based hydrogel binder.

A seventeenth embodiment can include the bipolar battery of the fifteenth embodiment, wherein the binder is selected from the group consisting of methyl cellulose (MC), carboxymethyl cellulose (CMC), hydroxypropyl cellulose (HPC), hydroxypropylmethyl cellulose (HPMC), hydroxyehtylmethyl cellulose (HEMC) and carboxymethylhydroxyethyl cellulose and hydroxyethyl cellulose (HEC).

An eighteetnh embodiment can include the bipolar battery of the fifteenth embodiment, wherein the binder is cross-linked with a copolymer selected from the group consisting of polyvinyl alcohol, polyvinylacetate, polyaniline, polyvinylpyrrolidone, polyvinylidene fluoride and polypyrrole.

In a nineteenth embodiment, a bipolar battery having at least two electrochemical cells electrically arranged in series to access a second electron capacity of manganese dioxide comprises a housing; an electrolyte disposed in the housing; a bipolar electrode disposed in the housing and comprising:

a first anode material; and a first cathode material, wherein the first cathode material and the first anode material are disposed on opposite faces of the bipolar electrode; an anode disposed in the housing and comprising a second anode material comprising: a zinc compound with trace elements of bismuth and indium; a zinc oxide compound; and a binder; a cathode disposed in the housing and comprising a second cathode material comprising electrolytic manganese dioxide (EMD); a bismuth compound selected from the group consisting of elemental bismuth and a bismuth salt; a conductive carbon; and a copper compound selected from the group consisting of elemental copper and a copper salt; the first cathode material of the bipolar electrode facing the second anode material, and the first anode material of the bipolar electrode facing the second cathode material; and a first microporous separator between the first cathode material and the second anode material and a second microporous separator between the first anode material and the second cathode material.

A twentieth embodiment can include the bipolar battery of the nineteenth embodiment, wherein the bipolar battery accesses greater than 0% and less than or equal to 40% of the second electron capacity of manganese dioxide for at least 10 cycles.

In a twenty first embodiment, a method of producing a cathode comprises the steps of: mixing multiple ingredients to form a cathode paste, the multiple ingredients comprising: a manganese oxide compound selected from the group consisting of birnessite-phase manganese dioxide ($\delta$-MnO$_2$) and electrolytic manganese dioxide (EMD); a bismuth compound selected from the group consisting of elemental bismuth and a bismuth salt; and a copper compound selected from the group consisting of elemental copper and a copper salt; pressing the cathode paste onto a cathode current collector at a pressure between $6.9 \times 10^6$ and $1.4 \times 10^8$ Pascals to form a pressed assembly; and drying the pressed assembly to produce a cathode.

A twenty second embodiment can include the method of the twenty first embodiment, wherein the multiple ingredients further comprises a conductive carbon.

A twenty third embodiment can include the method of the twenty first or twenty second embodiment, wherein the multiple ingredients further comprises a binder.

In a twenty fourth embodiment, a method of producing a cathode comprises the steps of: mixing multiple ingredients to form a cathode paste, the multiple ingredients comprising: a manganese oxide compound selected from the group consisting of birnessite-phase manganese dioxide ($\delta$-MnO$_2$) and electrolytic manganese dioxide (EMD); a bismuth compound selected from the group consisting of elemental bismuth and a bismuth salt; and a conductive carbon; simultaneously pressing the cathode paste onto a cathode current collector and onto a substrate of elemental copper at a pressure between $6.9 \times 10^6$ and $1.4 \times 10^8$ Pascals to form a pressed assembly; and drying the pressed assembly to produce a cathode.

In a twenty fifth embodiment, a method of producing a cathode comprises the steps of: mixing multiple ingredients to form a cathode paste, the multiple ingredients comprising: a manganese oxide compound selected from the group consisting of electrolytic manganese dioxide (EMD); a conductive carbon; and pressing the cathode paste onto a nickel current collector at a pressure between $6.9 \times 10^6$ and $1.4 \times 10^8$ Pascals to form a pressed assembly; drying the pressed assembly to produce a cathode.

A twenty sixth embodiment can include the method of the twenty fifth embodiment, wherein the multiple ingredients further comprises a binder.

In a twenty seventh embodiment, a method of producing an anode comprises the steps of: mixing multiple ingredients to form an anode paste, the multiple ingredients comprising: a zinc compound with trace elements of bismuth and indium; and a zinc oxide compound; simultaneously pressing the cathode paste onto a nickel current collector at a pressure between $6.9 \times 10^6$ and $1.4 \times 10^8$ Pascals to form a pressed assembly; and drying the pressed assembly to produce an anode.

A twenty eight embodiment can include the method of the twenty seventh embodiment, wherein the multiple ingredients further comprises a binder.

A twenty ninth embodiment can include the method of the first or nineteenth embodiment, wherein the bipolar battery is in prismatic form, cylindrical form and zigzag form.

A Thirtieth embodiment can include the method of the twenty ninth embodiment, wherein individual cells that make up the bipolar battery are separated from each other by polymer frames made from poly(methyl methacrylate), polyvinyl chloride, polystyrene, polycarbonate, polyethylene terephthalate, low density polyethylene, high density polyethylene, ultra-high-molecular-weight polyethylene, very-high-molecular-weight polyethylene, polytetrafluoroethylene, polyester, polyimide, polysulfone, polyphenylene sulfide and polyvinylidene fluoride.

A thirty first embodiment can include the method of the thirtieth embodiment, wherein the frame is affixed with a metal or rubber gasket to prevent any leakage of electrolyte between the individual cells arranged in series.

A thirty second embodiment can include the method of the twenty ninth or thirtieth embodiment, wherein the frames are rigid structures or flexible to separate the cells and fit the form of the bipolar design.

A thirty third embodiment can include the method of the first or nineteenth embodiment, wherein the electrolyte is gelled or liquid.

A thirty fourth embodiment can include the method of the thirty third embodiment, wherein the electrolyte is sodium hydroxide, potassium hydroxide, lithium hydroxide, barium hydroxide, or mixtures thereof.

A thirty fifth embodiment can include the method of the thirty third or thirty fourth embodiment, wherein the gelled electrolyte are made by mixing a cellulose derivative and an alkaline solution.

A thirty sixth embodiment can include the method of the first or nineteenth embodiment, wherein the bipolar battery is in a sealed configuration and comprises a gas recombiner or a gas trapper that traps gas bubbles in the electrolyte.

A thirty seventh embodiment can include the method of the thirty sixth embodiment, wherein the gas recombiner is calcium mixed with electrode materials.

A thirty eighth embodiment can include the method of the thirty sixth embodiment, wherein the gas trapper is thixotropic silic acid or palladium.

A thirty ninth embodiment can include the method of the first or nineteenth embodiment, wherein the first anode materials comprises calcium, magnesium or aluminum.

In a fortieth embodiment, a method of producing a bipolar electrode comprises the steps of: mixing multiple ingredients to form an anode paste, the multiple ingredients comprising: a zinc compound with trace elements of bismuth and indium; a zinc oxide compound; mixing multiple ingredients to form a cathode paste, the multiple ingredients comprising: electrolytic manganese dioxide (EMD); a conductive carbon; simultaneously pressing the cathode paste and anode paste onto opposite sides of the nickel current collector at a pressure between $6.9 \times 10^6$ and $1.4 \times 10^8$ Pascals to form a pressed assembly; and drying the pressed assembly to produce a bipolar electrode.

In a forty first embodiment, a method of producing a bipolar electrode comprises the steps of: mixing multiple ingredients to form an anode paste, the multiple ingredients comprising: a zinc compound with trace elements of bismuth and indium; a zinc oxide compound; a binder; mixing multiple ingredients to form a cathode paste, the multiple ingredients comprising: electrolytic manganese dioxide (EMD); a conductive carbon; a bismuth compound selected from the group consisting of elemental bismuth and a bismuth salt; and a copper compound selected from the group consisting of elemental copper and a copper salt; simultaneously pressing the cathode paste and anode paste onto opposite sides of the bipolar current collector at a pressure between $6.9 \times 10^6$ and $1.4 \times 10^8$ Pascals to form a pressed assembly; and drying the pressed assembly to produce a bipolar electrode.

In a forty second embodiment, a method of producing a bipolar electrode comprises the steps of: mixing multiple ingredients to form an anode paste, the multiple ingredients comprising: a zinc compound with trace elements of bismuth and indium; a zinc oxide compound; a binder; mixing multiple ingredients to form a cathode paste, the multiple ingredients comprising: electrolytic manganese dioxide (EMD); a bismuth compound selected from the group consisting of elemental bismuth and a bismuth salt; and a conductive carbon; simultaneously pressing the cathode paste onto a face of the bipolar current collector and onto a substrate of elemental copper, and pressing the anode paste onto the opposite face of the bipolar current collector at a pressure between $6.9 \times 10^6$ and $1.4 \times 10^8$ Pascals to form a pressed assembly; and drying the pressed assembly to produce a bipolar electrode.

In a forty third embodiment, a method of producing a second electron bipolar battery with at least two cells arranged in series comprises the steps of: disposing a cathode into a housing, the cathode comprising a first cathode material comprising: a manganese oxide compound selected from the group consisting of birnessite-phase manganese dioxide ($\delta$-$MnO_2$) and electrolytic manganese dioxide (EMD); a bismuth compound selected from the group consisting of elemental bismuth and a bismuth salt; a conductive carbon; and a copper compound selected from the group consisting of elemental copper and a copper salt; disposing a bipolar electrode into the housing, the bipolar electrode comprising a second_cathode material and a second anode material pressed on opposite sides, the bipolar electrode comprising: a manganese oxide compound selected from the group consisting of birnessite-phase manganese dioxide ($\delta$-$MnO_2$) and electrolytic manganese dioxide (EMD); a bismuth compound selected from the group consisting of elemental bismuth and a bismuth salt; a conductive carbon; and a copper compound selected from the group consisting of elemental copper and a copper salt; a zinc compound with trace elements of bismuth and indium; a zinc oxide compound; a binder; disposing an anode into the housing, the anode comprising a first anode material comprising: a zinc compound with trace elements of bismuth and indium; a zinc oxide compound; a binder; forming a polymeric separator; disposing the polymeric separator between the anode, the bipolar electrode and the cathode such that the anode, the bipolar and the cathode are separated; disposing polymer frames that separate the anode and cathode side of the bipolar electrode from the anode side of the bipolar and cathode to create 2 cells and prevent any electrolyte contact between the cells; and adding an alkaline electrolyte to the housing.

In a forty fourth embodiment, a method of producing a bipolar battery with at least two cells arranged in series cycling at limited depth of discharge of a second electron capacity comprises the steps of: disposing a cathode into a housing, the cathode comprising a first cathode material comprising: electrolytic manganese dioxide (EMD); a conductive carbon; disposing a bipolar electrode into the housing, the bipolar electrode comprising a second cathode material and a second anode material pressed on opposite sides comprising: electrolytic manganese dioxide (EMD); a conductive carbon; a zinc compound with trace elements of bismuth and indium; a zinc oxide compound; a binder; disposing an anode into the housing, the anode comprising a first anode material comprising: a zinc compound with trace elements of bismuth and indium; a zinc oxide compound; a binder; forming a polymeric separator; disposing the polymeric separator between the anode, the bipolar electrode and the cathode such that the anode, the bipolar and the cathode are separated; disposing polymer frames that separate the anode and the second cathode material of the bipolar electrode from the second anode material of the bipolar and the cathode to create two cells and prevent electrolyte contact between the two cells; and adding an alkaline electrolyte to the housing.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A bipolar battery having at least two electrochemical cells electrically arranged in series, the bipolar battery comprising:
   a housing;
   an electrolyte disposed in the housing;
   a bipolar electrode disposed in the housing, wherein the bipolar electrode comprises:
   a first anode material; and
   a first cathode material, wherein the first cathode material and the first anode material are disposed on opposite faces of a current collector;
   an anode disposed in the housing, wherein the anode comprises a second anode material comprising: zinc and a binder;
   a cathode disposed in the housing, wherein the cathode comprises a second cathode material comprising: an active material comprising a manganese oxide, and additives comprising a conductive carbon and a copper compound, wherein the first cathode material of the bipolar electrode faces the second anode material, and wherein the first anode material of the bipolar electrode faces the second cathode material;
   a first microporous separator disposed between the first cathode material and the second anode material; and
   a second microporous separator disposed between the first anode material and the second cathode material, where the at least two electrochemical cells are formed from cathode-anode pairs, and wherein a first electrochemical cell of the at least two electrochemical cells is fluidly sealed from a second electrochemical cell of the at least two electrochemical cells.

2. The bipolar battery of claim 1, wherein the second anode material further comprises bismuth and indium.

3. The bipolar battery of claim 1, wherein the second cathode material comprises a manganese oxide compound selected from the group consisting of birnessite-phase manganese dioxide ($\delta$—$MnO_2$) and electrolytic manganese dioxide (EMD).

4. The bipolar battery of claim 1, wherein the second cathode material further comprises a bismuth compound selected from the group consisting of elemental bismuth and a bismuth salt.

5. The bipolar battery of claim 1, wherein the copper compound in the second cathode material comprises: a copper compound selected from the group consisting of elemental copper and a copper salt.

6. The bipolar battery of claim 1, wherein a first cell is formed by the first cathode material and the second anode material, wherein a second cell is formed by the first anode material and the second cathode material.

7. The bipolar battery of claim 6, wherein the first cell is electrically coupled in series with the second cell.

8. The bipolar battery as recited in claim 1, wherein the second cathode material further comprises a conductive metal additive electroplated on the manganese oxide, wherein the conductive metal additive is selected from the group consisting of nickel, copper, silver, aluminum, gold, tin, cobalt, nickel-cobalt, brass, bronze, and combinations thereof.

9. The bipolar battery as recited in claim 8, wherein the electroplated conductive metal additive is present in the second cathode material at a concentration that is greater than 0 wt. % and less than or equal to 20 wt %.

10. The bipolar battery as recited in claim 1, wherein the conductive carbon is selected from the group consisting of graphite, carbon black, acetylene black, single walled carbon nanotubes, multi-walled carbon nanotubes, graphene, graphyne, graphene oxide, and combinations thereof.

11. The bipolar battery as recited in claim 1, wherein the second cathode material consists essentially of greater than 0 wt. % and less than or equal to 50 wt. % of the conductive carbon; between 1-20 wt. % of a bismuth compound; between 1-70 wt. % of the copper compound; greater than or equal to 0 wt. % and less than or equal to 10 wt. % of a binder; and the balance being the manganese oxide compound.

12. The bipolar battery as recited in claim 1, wherein the second anode material consists essentially of greater than 0 and less than or equal to 30% zinc oxide, greater than 0 and less than or equal to 10% binder and the balance being the zinc compound with trace amounts of bismuth and indium.

13. The bipolar battery as recited in claim 1, wherein the copper compound is a copper support.

14. The bipolar battery as recited in claim 1, wherein at least one of the first microporous separator or the second microporous separator comprises a polymer selected from the group consisting of a cellulose film, a sintered polymer film, a hydrophilically modified polyolefin, or combinations thereof.

15. The bipolar battery as recited in claim 1, wherein the second cathode material and the second anode material further comprises a polytetrafluoroethylene binder.

16. The bipolar battery as recited in claim 1, wherein the second cathode material and the second anode material further comprises a cellulose-based hydrogel binder.

17. The bipolar battery as recited in claim 1, wherein the second cathode material and the second anode material further comprises a binder, and wherein the binder is selected from the group consisting of methyl cellulose (MC), carboxymethyl cellulose (CMC), hydroxypropyl cellulose (HPC), hydroxypropylmethyl cellulose (HPMC), hydroxyethylmethyl cellulose (HEMC), carboxymethylhydroxyethyl cellulose, and hydroxyethyl cellulose (HEC).

18. The bipolar battery as recited in claim 17,
wherein the binder is crosslinked with a copolymer selected from the group consisting of polyvinyl alcohol, polyvinylacetate, polyaniline, polyvinylpyrrolidone, and polypyrrole.

19. The bipolar battery of claim 1, wherein the bipolar battery is in a prismatic form, a cylindrical form, or a compressed zigzag form within the housing.

20. The bipolar battery of claim 1, wherein the current collector is at least one of copper, a copper alloy, or a copper plated metal.

21. The bipolar battery of claim 1, wherein the current collector comprises a cathode conductive mesh, an anode conductive mesh, and a current collector foil, wherein the first anode material is pressed into the anode conductive mesh, wherein the first cathode material is pressed into the cathode conductive mesh, and wherein the cathode conductive mesh and the anode conductive mesh are in electrical contact with the current collector foil.

22. The bipolar battery of claim 21, wherein the cathode conductive mesh comprises a current collector tab, and wherein the current collector tab is coupled to the current collector foil to electrically couple the cathode conductive mesh to the current collector foil.

\* \* \* \* \*